(12) United States Patent
Kuma et al.

(10) Patent No.: US 11,995,873 B2
(45) Date of Patent: May 28, 2024

(54) IMAGE PROCESSING APPARATUS AND METHOD

(71) Applicant: SONY GROUP CORPORATION, Tokyo (JP)

(72) Inventors: Satoru Kuma, Tokyo (JP); Ohji Nakagami, Kanagawa (JP); Koji Yano, Tokyo (JP); Tsuyoshi Kato, Tokyo (JP)

(73) Assignee: SONY GROUP CORPORATION, Tokyo (JP)

(*) Notice: Subject to any disclaimer, the term of this patent is extended or adjusted under 35 U.S.C. 154(b) by 441 days.

(21) Appl. No.: 17/309,798

(22) PCT Filed: Dec. 13, 2019

(86) PCT No.: PCT/JP2019/048878
§ 371 (c)(1),
(2) Date: Jun. 18, 2021

(87) PCT Pub. No.: WO2020/137603
PCT Pub. Date: Jul. 2, 2020

(65) Prior Publication Data
US 2022/0058832 A1 Feb. 24, 2022

(30) Foreign Application Priority Data
Dec. 28, 2018 (JP) .................. 2018-247593

(51) Int. Cl.
*G06T 9/00* (2006.01)
*G06T 7/50* (2017.01)
(Continued)

(52) U.S. Cl.
CPC ............. *G06T 9/001* (2013.01); *G06T 7/50* (2017.01); *H04N 19/172* (2014.11); *H04N 19/597* (2014.11); *G06T 2207/10028* (2013.01)

(58) Field of Classification Search
CPC . G06T 5/20; G06T 5/002; G06T 2207/10081; H04N 13/128; H04H 13/189
See application file for complete search history.

(56) References Cited

U.S. PATENT DOCUMENTS 7,535,515 B2 * 5/2009 Bacche .................. H04N 9/78
348/665
7,570,832 B2 * 8/2009 Chui ....................... G06T 5/20
348/606
(Continued)

FOREIGN PATENT DOCUMENTS

CN 109196559 A 1/2019
CN 110383342 A 10/2019
(Continued)

OTHER PUBLICATIONS

Vida, et al., "Geometry-Guided 3D Data Interpolation for Projection-Based Dynamic Point Cloud Coding", 7th European Workshop on Visual Information Processing (EUVIP), Nov. 26, 2018, pp. 1-6.
(Continued)

*Primary Examiner* — Yosef Kassa
(74) *Attorney, Agent, or Firm* — CHIP LAW GROUP

(57) ABSTRACT

The present disclosure relates to an image processing apparatus and an image processing method each capable of reducing image quality deterioration. A connection component constituted by points that are included in a point group representing a three-dimensional structure, located adjacent to each other, and projected in an identical direction is projected on a two-dimensional plane in a plurality of directions to generate patches in the respective directions. A frame image where the generated patches in the respective directions are arranged is coded. For example, the present disclosure is applicable to an information processing apparatus, an image processing apparatus, an electronic appara-
(Continued)

tus, an information processing method, a program, or the like.

20 Claims, 27 Drawing Sheets

(51) Int. Cl.
  *H04N 19/172* (2014.01)
  *H04N 19/597* (2014.01)

(56) References Cited

U.S. PATENT DOCUMENTS

| | | | |
|---|---|---|---|
| 7,590,589 B2* | 9/2009 | Hoffberg | G06Q 40/06 |
| | | | 705/37 |
| 8,019,801 B1* | 9/2011 | Robb | G06V 10/776 |
| | | | 707/899 |
| 8,582,916 B2* | 11/2013 | Bar-Aviv | G06T 5/20 |
| | | | 382/128 |
| 9,077,967 B2* | 7/2015 | Yoshie | H04N 13/128 |
| 2017/0347120 A1 | 11/2017 | Chou et al. | |
| 2018/0268570 A1 | 9/2018 | Budagavi et al. | |
| 2019/0087978 A1 | 3/2019 | Tourapis et al. | |
| 2019/0087979 A1 | 3/2019 | Mammou et al. | |
| 2019/0156518 A1 | 5/2019 | Mammou et al. | |
| 2019/0156519 A1 | 5/2019 | Mammou et al. | |
| 2019/0156520 A1 | 5/2019 | Mammou et al. | |
| 2019/0311500 A1 | 10/2019 | Mammou et al. | |

FOREIGN PATENT DOCUMENTS

| | | |
|---|---|---|
| EP | 3349182 A1 | 7/2018 |
| EP | 3465622 A1 | 4/2019 |
| KR | 10-2019-0105011 A | 9/2019 |
| WO | 2017/209961 A1 | 12/2017 |
| WO | 2018/130491 A1 | 7/2018 |
| WO | 2019/013430 A1 | 1/2019 |
| WO | 2019/055963 A1 | 3/2019 |

OTHER PUBLICATIONS

Mekuria, et al., "Design, Implementation and Evaluation of a Point Cloud Codec for Tele-Immersive Video", IEEE Transactions on Circuits and Systems for Video Technology, vol. 27, No. 4, Apr. 2017, pp. 828-842.

International Search Report and Written Opinion of PCT Application No. PCT/JP2019/048878, dated Mar. 17, 2020, 15 pages of ISRWO.

Mammou, et al., "Video-based and Hierarchical Approaches Point Cloud Compression", International Organization For Standardization Organization International De Normalisation ISO/IEC JTC1/SC29/WG11, MPEG m41649, Coding Of Moving Pictures And Associated Audio, Macau, China, Oct. 2017, 3 pages.

Golla, et al., "Real-time Point Cloud Compression", IEEE/RSJ International Conference on Intelligent Robots and Systems (IROS), 2015, 6 pages.

Mammou, et al., "PCC Test Model Category 2 v0", International Organization For Standardization Organization International De Normalisation, ISO/IEC JTC1/SC29/WG11, N17248, Oct. 2017, 11 pages.

* cited by examiner

F I G. 2

| METHOD 1 | ADDITION OF SUB PATCH (MULTIPLE PROJECTION) |
|---|---|
| METHOD 2 | ADDITION OF PARTIAL PATCH |
| METHOD 3 | Missed Patch |
| METHOD 4 | ADAPTIVE SELECTION OF PROJECTION DIRECTION AND PATCH INTEGRATION |

FIG. 3

| METHOD | CHANGE | EFFECT | COMBINATION |
|---|---|---|---|
| METHOD 1 | Enc & Dec | REDUCTION OF SUBJECTIVE IMAGE QUALITY DETERIORATION BY PROJECTION LOSS | |
| METHOD 2 | Enc & Dec | REDUCTION OF SUBJECTIVE IMAGE QUALITY DETERIORATION BY PROJECTION LOSS | |
| METHOD 3 | Enc & Dec | REDUCTION OF SUBJECTIVE IMAGE QUALITY DETERIORATION BY PROJECTION LOSS | METHOD 1 OR METHOD 2 |
| METHOD 4 | Enc | REDUCTION OF SUBJECTIVE IMAGE QUALITY DETERIORATION BY PROJECTION LOSS | METHOD 1 TO METHOD 3 |

FIG. 4

| METHOD | Geometry Video | Texture Video | Occupancy Video | Occupancy Aux Info |
|---|---|---|---|---|
| METHOD 1 | ALWAYS TRANSFER | OPTIONAL | ALWAYS TRANSFER | ALWAYS TRANSFER |
| METHOD 2 | ALWAYS TRANSFER | OPTIONAL | OPTIONAL | ALWAYS TRANSFER |
| METHOD 3 | ALWAYS TRANSFER | OPTIONAL | ALWAYS TRANSFER | ALWAYS TRANSFER |
| METHOD 4 | ALWAYS TRANSFER | ALWAYS TRANSFER | ALWAYS TRANSFER | ALWAYS TRANSFER |

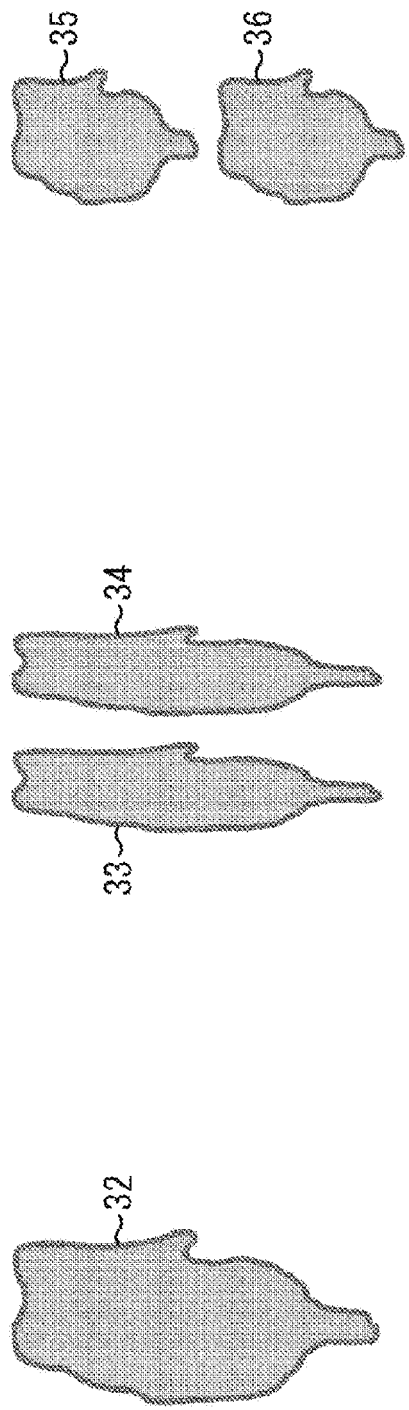

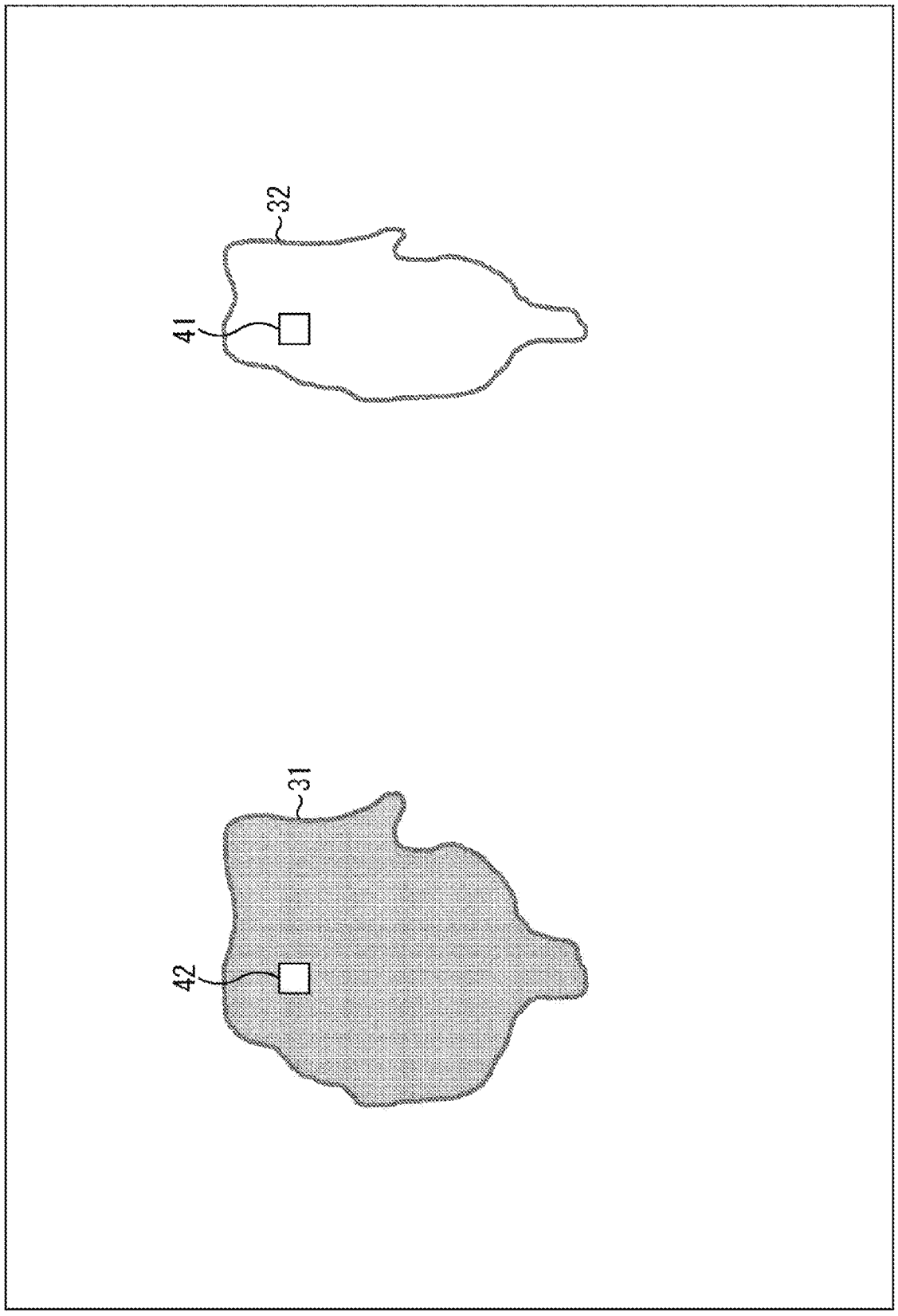

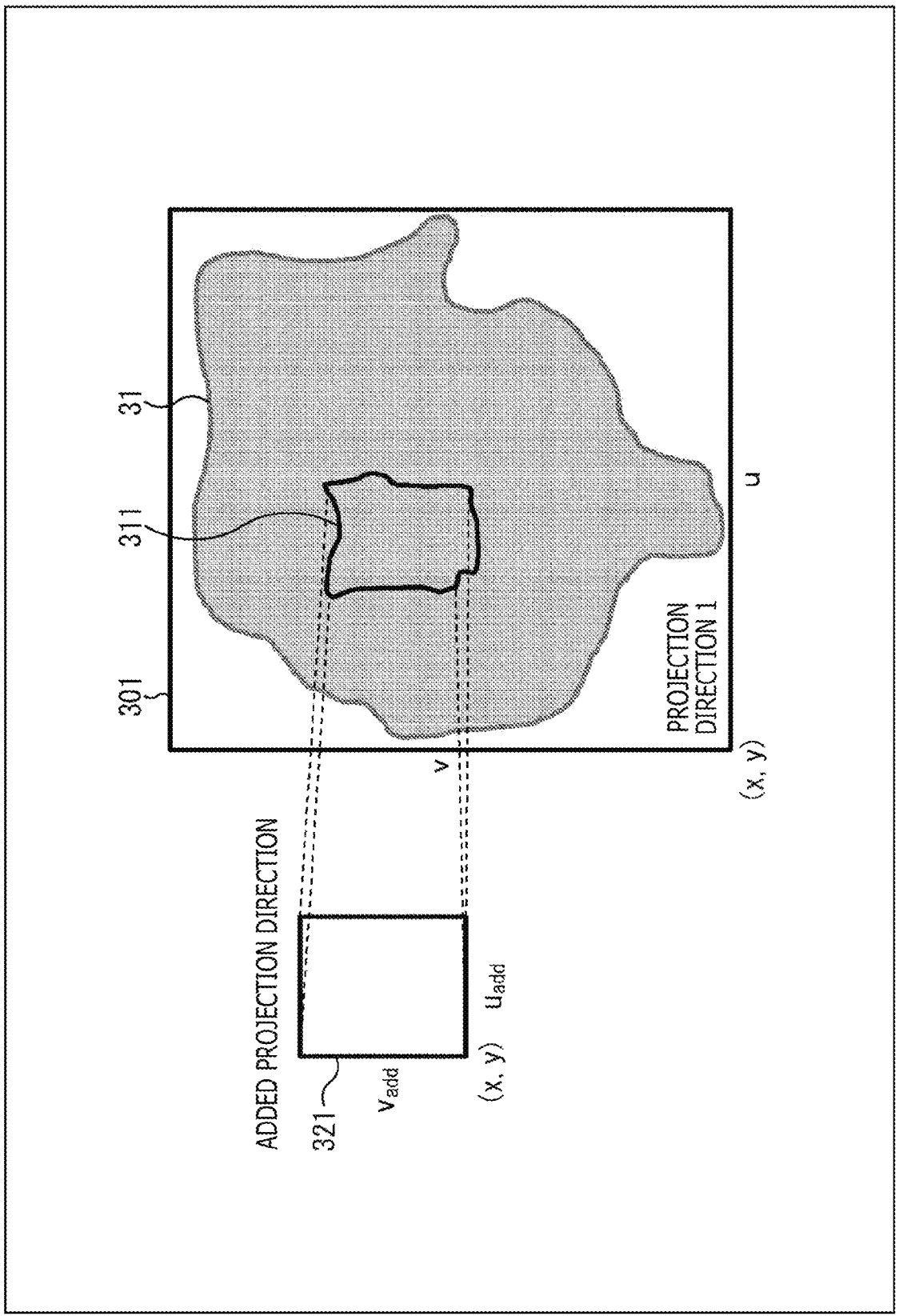

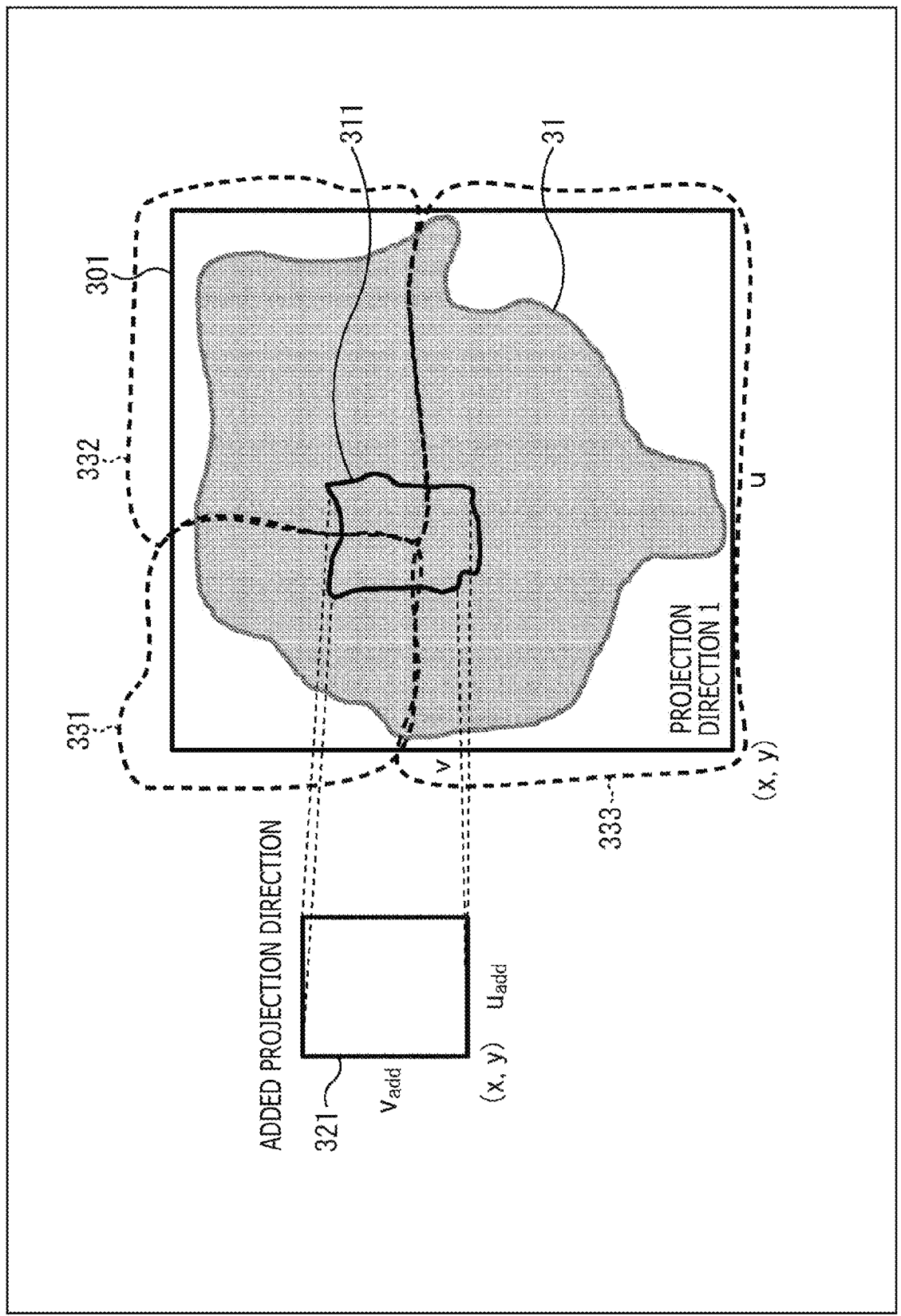

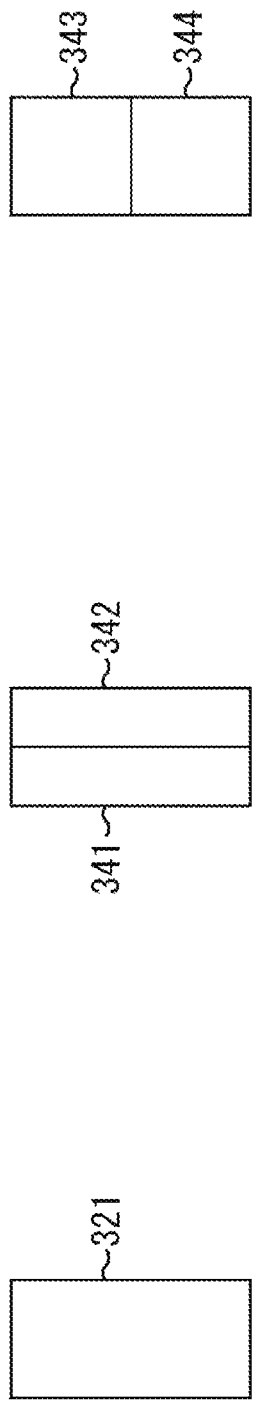
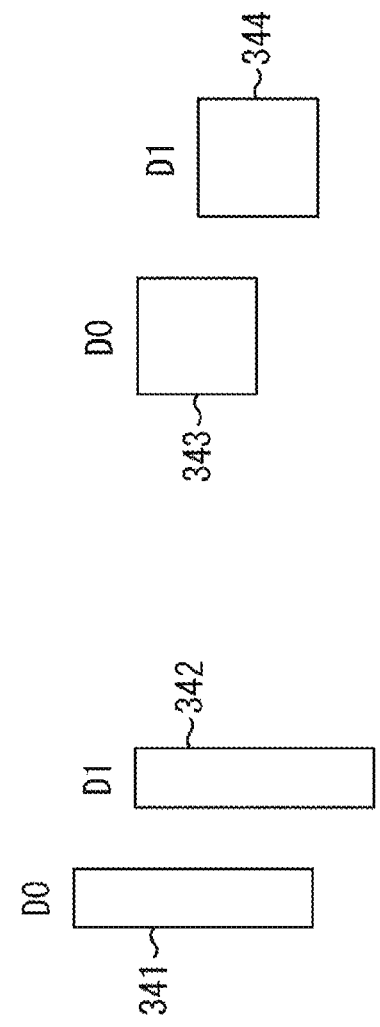

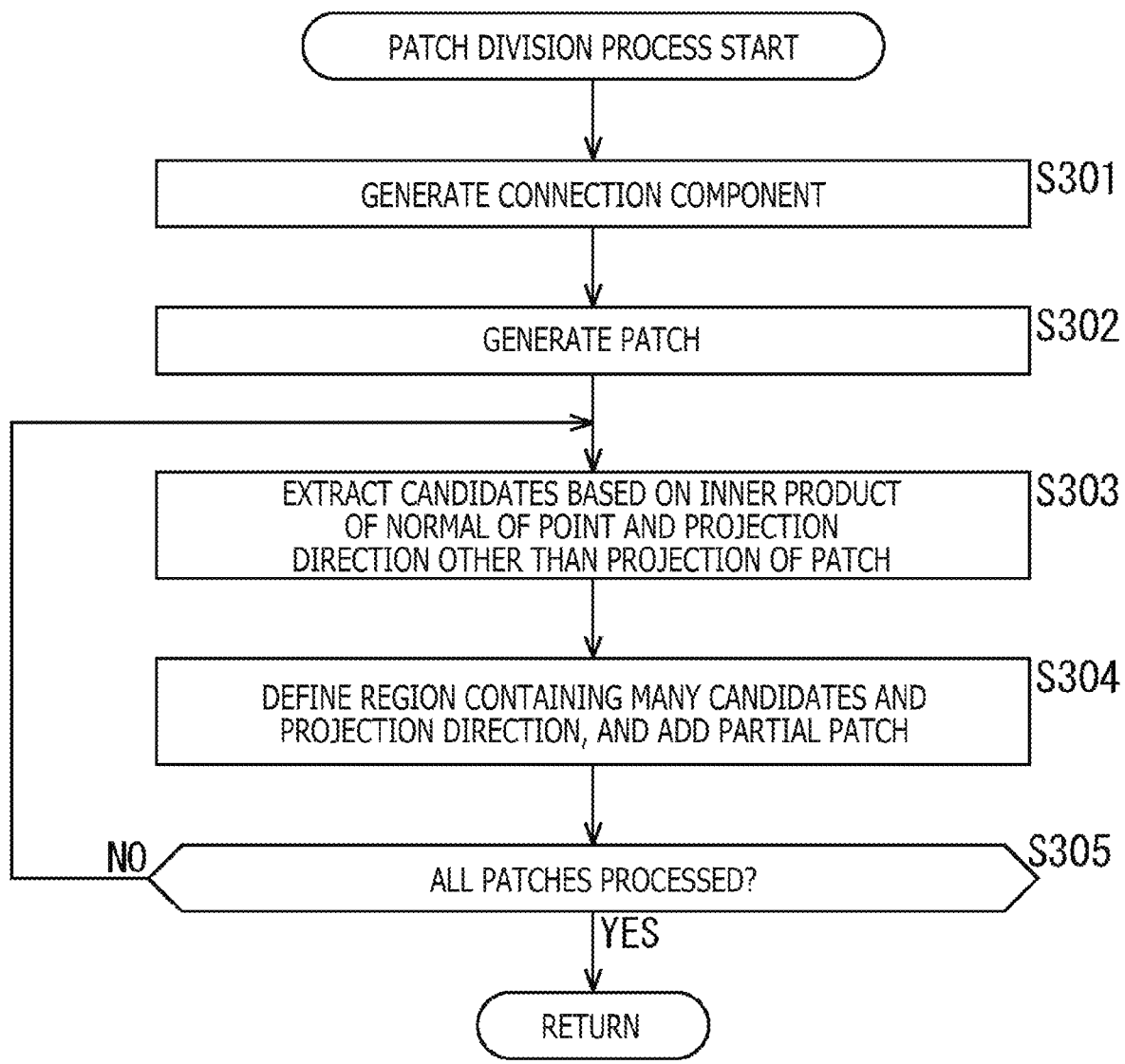

IMAGE PROCESSING APPARATUS AND METHOD

CROSS REFERENCE TO RELATED APPLICATIONS

This application is a U.S. National Phase of International Patent Application No. PCT/JP2019/048878 filed on Dec. 13, 2019, which claims priority benefit of Japanese Patent Application No. JP 2018-247593 filed in the Japan Patent Office on Dec. 28, 2018. Each of the above-referenced applications is hereby incorporated herein by reference in its entirety.

TECHNICAL FIELD

The present disclosure relates to an image processing apparatus and an image processing method, and particularly to an image processing apparatus and an image processing method each capable of reducing image quality deterioration.

BACKGROUND ART

There has been conventionally a coding method which uses a voxel, such as an octree, to code 3D data representing a three-dimensional structure like a point cloud (e.g., see NPL 1).

In recent years, for example, there has been proposed another coding method (hereinafter also referred to as a video-based approach) which projects position information and attribute information associated with a point cloud on a two-dimensional plane for each small region, arranges images (patches) projected on the two-dimensional plane within a frame image, and codes the frame image using a coding method for two-dimensional images (e.g., see NPL 2 to NPL 4).

CITATION LIST

Non Patent Literature

[NPL 1]
R. Mekuria, Student Member IEEE, K. Blom, P. Cesar, Member, IEEE, "Design, Implementation and Evaluation of a Point Cloud Codec for Tele-Immersive Video", tcsvt_paper_submitted_febrary.pdf
[NPL 2]
Tim Golla and Reinhard Klein, "Real-time Point Cloud Compression," IEEE, 2015
[NPL 3]
K. Mammou, "Video-based and Hierarchical Approaches Point Cloud Compression", MPEG m41649, October 2017
[NPL 4]
K. Mammou, "PCC Test Model Category 2 v0," N17248 MPEG output document, October 2017

SUMMARY

Technical Problem

However, in the case of the video-based approach described above, points may be lost by projection of the point cloud (small region). This loss of points may deteriorate subjective image quality of a display image generated by projecting, on the two-dimensional plane, 3D data produced by decoding and reconstructing coded data obtained by the video-based approach.

The present disclosure has been developed in consideration of the aforementioned circumstances, and achieves reduction of image quality deterioration of a two-dimensional display image of 3D data.

Solution to Problem

An image processing apparatus according to one aspect of the present technology is directed to an image processing apparatus including a patch generation unit that projects, on a two-dimensional plane in a plurality of directions, a connection component constituted by points that are included in a point group representing a three-dimensional structure, located adjacent to each other, and projected in an identical direction to generate patches in the respective directions, and a coding unit that codes a frame image where the patches generated in the respective directions by the patch generation unit are arranged.

An image processing method according to one aspect of the present technology is directed to an image processing method including projecting, on a two-dimensional plane in a plurality of directions, a connection component constituted by points that are included in a point group representing a three-dimensional structure, located adjacent to each other, and projected in an identical direction to generate patches in respective directions, and coding a frame image where the patches generated in the respective directions are arranged.

An image processing apparatus according to a further aspect of the present technology is directed to an image processing apparatus including a decoding unit that decodes coded data of a frame image where patches are arranged in a plurality of directions, the patches being generated by projecting, on a two-dimensional plane in the respective directions, a connection component constituted by points that are included in a point group representing a three-dimensional structure, located adjacent to each other, and projected in an identical direction, and a reconstruction unit that reconstructs the point group using the patches in the respective directions obtained by decoding the coded data using the decoding unit.

An image processing method according to the further aspect of the present technology is directed to an image processing method including decoding coded data of a frame image where patches are arranged in a plurality of directions, the patches being generated by projecting, on a two-dimensional plane in the respective directions, a connection component constituted by points that are included in a point group representing a three-dimensional structure, located adjacent to each other, and projected in an identical direction, and reconstructing the point group using the patches in the respective directions obtained by decoding the coded data.

An image processing apparatus according to a still further aspect of the present technology is directed to an image processing apparatus including a patch generation unit that generates a patch by projecting, on a two-dimensional plane, a connection component constituted by points that are included in a point group representing a three-dimensional structure, located adjacent to each other, and projected in an identical direction, and generates Missed Patch that contains information associated with a point likely to be lost by projection of the connection component, and a coding unit that codes a frame image where the patch generated by the patch generation unit is arranged, and the Missed Patch.

An image processing method according to a still further aspect of the present technology is directed to an image processing method including generating a patch by projecting, on a two-dimensional plane, a connection component constituted by points that are included in a point group representing a three-dimensional structure, located adjacent to each other, and projected in an identical direction, and generating Missed Patch that contains information associated with a point likely to be lost by projection of the connection component, and coding a frame image where the generated patch is arranged, and the Missed Patch.

An image processing apparatus according to a still further aspect of the present technology is directed to an image processing apparatus including a decoding unit that decodes coded data that includes a patch obtained by projecting, on a two-dimensional plane, a connection component constituted by points that are included in a point group representing a three-dimensional structure, located adjacent to each other, and projected in an identical direction, and Missed Patch containing information associated with a point likely to be lost by projection of the connection component, and a reconstruction unit that reconstructs the point group using the patch and the Missed Patch obtained by decoding the coded data using the decoding unit.

An image processing method according to a still further aspect of the present technology is directed to an image processing method including decoding coded data that includes a patch obtained by projecting, on a two-dimensional plane, a connection component constituted by points that are included in a point group representing a three-dimensional structure, located adjacent to each other, and projected in an identical direction, and Missed Patch containing information associated with a point likely to be lost by projection of the connection component, and reconstructing the point group using the patch and the Missed Patch obtained by decoding the coded data.

An image processing apparatus according to a still further aspect of the present technology is directed to an image processing apparatus including a patch generation unit that generates a patch by projecting a part of a connection component constituted by points that are included in a point group representing a three-dimensional structure, located adjacent to each other, and projected in an identical direction, such that the part of the connection component is projected in a projection direction updated on the basis of the part of the connection component, and generates a patch by projecting the other part of the connection component in a projection direction set on the basis of the entire connection component, and a coding unit that codes a frame image where the patches generated by the patch generation unit are arranged.

An image processing method according to a still further aspect of the present technology is directed to an image processing method including generating a patch by projecting a part of a connection component constituted by points that are included in a point group representing a three-dimensional structure, located adjacent to each other, and projected in an identical direction, such that the part of the connection component is projected in a projection direction updated on the basis of the part of the connection component, and generating a patch by projecting the other part of the connection component in a projection direction set on the basis of the entire connection component, and coding a frame image where the generated patches are arranged.

According to the image processing apparatus and method of the one aspect of the present technology, a connection component constituted by points that are included in a point group representing a three-dimensional structure, located adjacent to each other, and projected in an identical direction is projected on a two-dimensional plane in a plurality of directions to generate patches in respective directions. A frame image where the patches generated in the respective directions are arranged is coded.

According to the image processing apparatus and method of the further aspect of the present technology, coded data of a frame image where patches are arranged in a plurality of directions, the patches being generated by projecting, on a two-dimensional plane in the respective directions, a connection component constituted by points that are included in a point group representing a three-dimensional structure, located adjacent to each other, and projected in an identical direction is decoded. The point group is reconstructed using the patches in the respective directions obtained by decoding the coded data.

According to the image processing apparatus and method of the still further aspect of the present technology, a patch is generated by projecting, on a two-dimensional plane in a plurality of directions, a connection component constituted by points that are included in a point group representing a three-dimensional structure, located adjacent to each other, and projected in an identical direction, and Missed Patch that contains information associated with a point likely to be lost by projection of the connection component is generated. A frame image where the generated patch is arranged, and the Missed Patch are coded.

According to the image processing apparatus and method of the still further aspect of the present technology, coded data that includes a patch obtained by projecting, on a two-dimensional plane, a connection component constituted by points that are included in a point group representing a three-dimensional structure, located adjacent to each other, and projected in an identical direction, and Missed Patch containing information associated with a point likely to be lost by projection of the connection component is decoded. The point group is reconstructed using the patch and the Missed Patch obtained by decoding the coded data.

According to the image processing apparatus and method of the still further aspect of the present technology, a patch is generated by projecting a part of a connection component constituted by points that are included in a point group representing a three-dimensional structure, located adjacent to each other, and projected in an identical direction, such that the part of the connection component is projected in a projection direction updated on the basis of the part of the connection component, and a patch is generated by projecting the other part of the connection component in a projection direction set on the basis of the entire connection component. A frame image where the generated patches are arranged is coded.

BRIEF DESCRIPTION OF DRAWINGS

FIG. 2 is a diagram explaining examples of a patch generation method.

FIG. 3 is a diagram explaining examples of a method for generating respective patches.

FIG. 4 is a diagram explaining examples of a method for generating respective patches.

FIGS. 6A, 6B, 6C, 6D, and 6E depict diagrams depicting an example of an interlace process for a sub patch.

FIG. 7 is a diagram explaining an example of a state of reconstruction of 3D data.

FIG. 15 is a diagram explaining an example of a partial patch.

FIG. 16 is a diagram explaining an example of a partial patch.

FIGS. 17A, 17B, 17C, 17D, and 17E depict diagrams depicting an example of an interlace process for a partial region.

FIG. 19 is a flowchart explaining an example of a flow of a patch division process.

DESCRIPTION OF EMBODIMENTS

Figure 1:
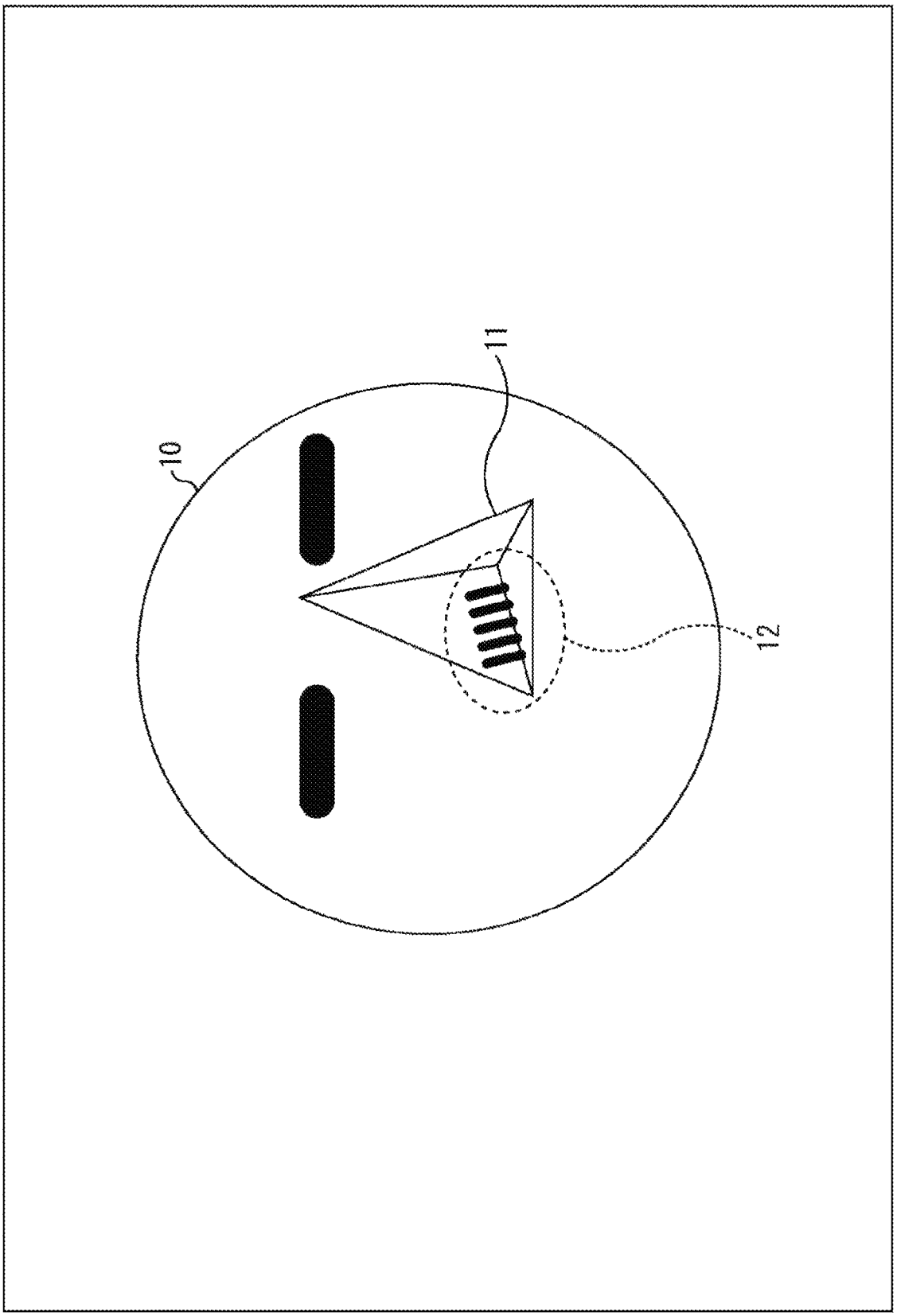
FIG. 1 is a diagram explaining an example of a loss caused by projection.

Modes for carrying out the present disclosure (hereinafter referred to as embodiments) will be hereinafter described. Note that the description will be presented in the following order.

1. Patch generation
2. First embodiment (Method 1)
3. Second embodiment (Method 2)
4. Third embodiment (Method 3)
5. Fourth embodiment (Method 4)
6. Supplementary notes 1. Patch Generation <Literatures and the Like Supporting Technical Content and Technical Terms>

A range disclosed in the present technology include not only content described in the embodiments, but also content described in the following non-patent literatures known at the time of filing of the present application.

NPL 1: (identified above)

NPL 2: TELECOMMUNICATION STANDARDIZATION SECTOR OF ITU (International Telecommunication Union), "Advanced video coding for generic audiovisual services", H.264, April 2017

NPL 3: TELECOMMUNICATION STANDARDIZATION SECTOR OF ITU (International Telecommunication Union), "High efficiency video coding", H.265, December 2016

NPL 4: Jianle Chen, Elena Alshina, Gary J. Sullivan, Jens-Rainer, Jill Boyce, "Algorithm Description of Joint Exploration Test Model 4", JVET-G1001_v1, Joint Video Exploration Team (JVET) of ITU-T SG 16 WP 3 and ISO/IEC JTC 1/SC 29/WG 11 7th Meeting: Torino, IT, 13-21 Jul. 2017

Accordingly, the content described in the above non-patent literatures are also grounds for determining support requirements. For example, it is assumed that Quad-Tree Block Structure described in NPL 3, and QTBT (Quad Tree Plus Binary Tree) Block Structure described in NPL 4 fall within the disclosure range of the present technology and meet the support requirements of the claims even if direct description of these structures is not included in the embodiments. Moreover, for example, it is assumed that technical terms such as parsing, syntax, and semantics similarly fall within the disclosure range of the present technology and meet the support requirements of the claims even if direct description of these terms is not included in the embodiments.

<Point Cloud>

There has conventionally been data such as a point cloud which represents a three-dimensional structure using position information, attribute information, or the like associated with a point group. The point cloud has a relatively simple data structure, and uses a sufficiently large number of points. Accordingly, the point cloud is capable of representing any three-dimensional structure with sufficient accuracy.

<Outline of Video-Based Approach>

There has been proposed a video-based approach which projects the foregoing position information and attribute information associated with the point cloud on a two-dimensional plane for each small region, arranges images (patches) projected on the two-dimensional plane within a frame image, and codes the frame image using a coding method for two-dimensional images.

According to the video-based approach, an input point cloud is divided into a plurality of small regions, and respective points are projected (patches are generated) on a two-dimensional plane for each of the small regions. The point cloud is constituted by position information (Geometry) and attribute information (Texture) associated with each point. Accordingly, projection on the two-dimensional plane is performed for each of the position information and attribute information.

Thereafter, the patches thus obtained are arranged in a frame image (two-dimensional image). Specifically, a frame image where a patch of position information is arranged (also referred to as a geometry video frame), and a frame image where a patch of attribute information is arranged (also referred to as a color video frame) are generated.

Note that position information associated with a point in a geometry video frame is represented as position information in a depth direction (depth value (Depth)). Accordingly, each pixel value of the frame image indicates this depth value.

Each of these frame images is coded by a coding system for two-dimensional planar images, such as AVC (Advanced Video Coding) and HEVC (High Efficiency Video Coding).

<Occupancy Map>

The video-based approach described above may further use an occupancy map. The occupancy map is map information indicating the presence or absence of a projection image (patch) for each of N×N pixels of the geometry video frame. For example, the occupancy map indicates a value "1" to represent a region where a patch is present (N×N pixels), and a value "0" to represent a region where a patch is absent (N×N pixels) in the geometry video frame.

The occupancy map described above is coded as data different from the geometry video frame and the color video frame, and transferred to the decoding side. A decoder is capable of recognizing whether or not a region contains a patch with reference to the occupancy map. In this manner, influences such as noise generated by coding or decoding are allowed to decrease, and more accurate restoration of 3D data is thus achievable. For example, even when depth values vary according to coding or decoding, the decoder is capable of ignoring depth values in a region where no patch is present (preventing designation of depth values as position information associated with 3D data) with reference to the occupancy map.

<Loss by Projection>

However, in the case of the video-based approach described above, points may be lost by projection of a point cloud (small region). This loss of points may deteriorate subjective image quality of a display image generated by projecting, on a two-dimensional plane, 3D data produced by decoding and reconstructing coded data generated by the video-based approach.

Projection is performed for each small region. Accordingly, in a case where an object has a complicated shape such as a face 10 depicted in FIG. 1, for example, a projection direction set on the basis of the whole of the small region may become a direction inappropriate (unpreferable) for a part within the small region. For example, while projection in a normal direction is generally preferred, projection directions in all parts of the small region do not necessarily become a normal direction for each. When the projection direction has an unpreferable angle for the three-dimensional shape, a loss of points may be produced by the projection.

The loss thus produced may deteriorate subjective image quality of a display image generated by projecting, on a two-dimensional plane, 3D data produced by decoding and reconstructing coded data obtained by the video-based approach. For example, in the case of FIG. 1, cyclic holes (slit-shaped holes) are produced in a portion surrounded by a dotted circle 12 at a nose 11 within the face 10.

<Improvement of Patch Generation>

Accordingly, improvement of a patch generation method is attempted to reduce deterioration of subjective image quality of display images caused by the loss during projection as described above.

For example, the small region may be projected in a plurality of directions. For example, a connection component constituted by points that are included in a point group representing a three-dimensional structure, located adjacent to each other, and projected in an identical direction is projected on a two-dimensional plane in a plurality of directions. Patches in the respective directions are generated. A frame image where the generated patches in the respective directions are arranged is coded. For example, an image processing apparatus includes a patch generation unit which projects, on a two-dimensional plane in a plurality of directions, a connection component (small region) constituted by points that are included in a point group representing a three-dimensional structure, located adjacent to each other, and projected in an identical direction, and generates patches in the respective directions, and a coding unit which codes a frame image where the patches generated in the respective directions using the patch generation unit are arranged.

In this manner, it is achievable to project each of partial regions within the small region in a more preferable direction (i.e., in such a direction where the number of points lost by projection decreases), and thus reduce a loss caused by projection. Accordingly, reduction of subjective image quality deterioration of a display image is achievable.

For example, as presented in Method 1 in a table of FIG. 2, a sub patch may be added to a main patch (multiple projection may be performed). Specifically, a main patch may be generated by projecting an entire connection component (small region) in a predetermined direction, and a sub patch may be generated by projecting the entire connection component in a direction different from the predetermined direction.

This configuration allows projection of the small region in a plurality of directions, and therefore achieves projection of each of the partial regions within the small region in a more preferable direction (i.e., in such a direction where the number of loss points produced by projection decreases), and reduces a loss caused by projection. Accordingly, reduction of subjective image quality deterioration of a display image is achievable.

Note that the sub patch may be generated only for position information and may be omitted for attribute information. Specifically, the main patch may be generated for both the position information and the attribute information associated with the connection component (small region), while the sub patch may be generated only for the position information associated with the connection component. In this manner, reduction of an increase in a code quantity (coding efficiency drop) is achievable.

Moreover, the sub patch may be interlaced and arranged in a frame image. Specifically, the generated sub patch may be separated into a plurality of parts for each row or column, and a frame image where the plurality of parts separated from the sub patch for each row or column is arranged may be coded. In this manner, reduction of an increase in a code quantity (coding efficiency drop) is achievable.

Furthermore, for example, as presented in Method 2 in the table of FIG. 2, a partial patch may be added to a patch. Specifically, a patch may be generated by projecting an entire connection component in a predetermined direction, and a partial patch may be generated by projecting a part of the entire connection component in a direction different from the predetermined direction.

In this manner, a partial region included in the small region and considered to be a region for which the projection direction for the entire small region is unpreferable is allowed to be projected also in a direction different from the projection direction. This partial region is therefore allowed to be projected in a more preferable direction (i.e., in such a direction where the number of points lost by projection decreases), and a loss caused by projection can thus be reduced. Accordingly, reduction of subjective image quality deterioration of a display image is achievable.

Note that the partial patch may be generated only for position information and may be omitted for attribute information. Specifically, the patch may be generated for both the position information and the attribute information associated with the connection component, while the partial patch may be generated only for the position information associated with the connection component. In this manner, reduction of an increase in a code quantity (coding efficiency drop) is achievable.

Moreover, the occupancy map associated with the partial patch may be omitted. Specifically, auxiliary patch information including information associated with a region containing the partial patch may be generated apart from the occupancy map associated with the generated patch. In this manner, reduction of an increase in a code quantity (coding efficiency drop) is achievable.

Moreover, the region containing the partial patch may be interlaced and arranged in a frame image. Specifically, the region containing the generated partial patch may be separated into a plurality of parts for each row or column, and a frame image where the plurality of parts separated from the region containing the partial patch for each row or column is arranged may be coded. In this manner, reduction of an increase in a code quantity (coding efficiency drop) is achievable.

Moreover, the decoding side is set in correspondence with this coding.

For example, a small region in coded data may be projected in a plurality of directions. For example, coded data of a frame image where patches are arranged in a plurality of directions is decoded. The patches are generated by projecting, on a two-dimensional plane in the respective directions, a connection component constituted by points that are included in a point group representing a three-dimensional structure, located adjacent to each other, and projected in an identical direction. The point group is reconstructed by using the patches in the respective directions obtained by decoding the coded data by the decoding unit. For example, an image processing apparatus includes a decoding unit which decodes coded data of a frame image where patches are arranged in a plurality of directions, the patches being generated by projecting, on a two-dimensional plane in the respective directions, a connection component constituted by points that are included in a point group representing a three-dimensional structure, located adjacent to each other, and projected in an identical direction, and a reconstruction unit which reconstructs the point group by using the patches in the respective directions obtained by decoding the coded data using the decoding unit.

This configuration can correctly decode coded data obtained by projecting the small region in a plurality of directions at the time of coding to project each of partial regions within the small region in a more preferable direction (i.e., in such a direction where the number of points lost by projection decreases), and therefore reduce a loss caused by projection. Accordingly, reduction of subjective image quality deterioration of a display image is achievable.

For example, as presented in Method 1 in the table of FIG. 2, a sub patch may be added to a main patch (multiple projection may be performed). Specifically, it is allowed to decode coded data of a frame image where a main patch generated by projecting an entire connection component in a predetermined direction, and a sub patch generated by projecting the entire connection component in a direction different from the predetermined direction are arranged, and reconstruct a point group using the main patch and the sub patch obtained by decoding the coded data.

This configuration can correctly decode coded data obtained by projecting the small region in a plurality of directions at the time of coding to project each of partial regions within the small region in a more preferable direction (i.e., in such a direction where the number of points lost by projection decreases), and therefore can reduce a loss caused by projection. Accordingly, reduction of subjective image quality deterioration of a display image is achievable.

Note that the sub patch may be generated only for position information and may be omitted for attribute information. In this manner, reduction of an increase in a code quantity (coding efficiency drop) is achievable.

Moreover, the sub patch may be interlaced and arranged in a frame image. In this manner, reduction of an increase in a code quantity (coding efficiency drop) is achievable.

Furthermore, for example, as presented in Method 2 in the table of FIG. 2, a partial patch may be added to a patch. For example, it is allowed to decode coded data of a frame image where a patch generated by projecting an entire connection component in a predetermined direction, and a partial patch generated by projecting a part of the entire connection component in a direction different from the predetermined direction are arranged, and reconstruct a point group using the main patch and the partial patch obtained by decoding the coded data.

This configuration can correctly decode coded data obtained at the time of coding by projecting the partial region included in the small region and considered to be a region for which the projection direction for the entire small region is unpreferable also in a direction different from the projection direction to project the partial region in a more preferable direction (i.e., in such a direction where the number of loss points produced by projection decreases), and therefore can reduce a loss caused by projection. Accordingly, reduction of subjective image quality deterioration of a display image is achievable.

Note that the partial patch may be generated only for position information and may be omitted for attribute information. In this manner, reduction of an increase in a code quantity (coding efficiency drop) is achievable.

Moreover, the occupancy map associated with the partial patch may be omitted. In this manner, reduction of an increase in a code quantity (coding efficiency drop) is achievable.

Moreover, a region containing the partial patch may be interlaced and arranged in a frame image. In this manner, reduction of an increase in a code quantity (coding efficiency drop) is achievable.

Moreover, for example, as presented in Method 3 of FIG. 2, information associated with a point lost by projection may be coded by adopting Missed Patch. For example, a patch is generated by projecting, on a two-dimensional plane, a connection component constituted by points that are included in a point group representing a three-dimensional structure, located adjacent to each other, and projected in an identical direction. Missed Patch containing information associated with a point which may be lost by projection of the connection component is generated. A frame image where the generated patches are arranged and Missed Patch are coded. For example, an image processing apparatus includes a patch generation unit which generates a patch by projecting, on a two-dimensional plane, a connection component constituted by points that are included in a point group representing a three-dimensional structure, located adjacent to each other, and projected in an identical direction, and generates Missed Patch containing information associated with a point which may be lost by projection of the connection component, and a coding unit which codes a frame image where the patch generated by the patch generation unit is arranged, and Missed Patch.

In this manner, a loss caused by projection can be reduced. Accordingly, reduction of subjective image quality deterioration of a display image is achievable.

Note that Missed Patch described above may be generated only for position information and may be omitted for attribute information. Specifically, Missed Patch containing position information associated with a point which may be lost by projection of the connection component may be generated. In this manner, reduction of an increase in a code quantity (coding efficiency drop) is achievable.

Moreover, the decoding side is set in correspondence with this coding.

For example, coded data may contain information associated with a point lost by projection as Missed Patch. For example, coded data containing a patch is decoded. The patch is generated by projecting, on a two-dimensional plane, a connection component constituted by points that are included in a point group representing a three-dimensional structure, located adjacent to each other, and projected in an identical direction, and Missed Patch containing information associated with a point which may be lost by projection of the connection component. The point group is reconstructed using the patch and Missed Patch obtained by decoding the coded data. For example, an image processing apparatus includes a decoding unit which decodes coded data containing a patch generated by projecting, on a two-dimensional plane, a connection component constituted by points that are included in a point group representing a three-dimensional structure, located adjacent to each other, and projected in an identical direction, and Missed Patch containing information associated with a point which may be lost by projection of the connection component, and a reconstruction unit which reconstructs the point group using the patch and Missed Patch obtained by decoding the coded data using the decoding unit.

In this manner, a loss caused by projection can be reduced. Accordingly, reduction of subjective image quality deterioration of a display image is achievable.

Furthermore, for example, as presented in Method 4 in the table of FIG. 2, a projection direction may be adaptively selected in a partial region within the small region. For example, a patch is generated by projecting a part of a connection component constituted by points that are included in a point group representing a three-dimensional structure, located adjacent to each other, and projected in an identical direction. In this case, the part of the connection component is projected in a projection direction updated on the basis of the part of the connection component. A patch is generated by projecting the other part of the connection component in a projection direction set on the basis of the entire connection component. A frame image where the generated patches are arranged is coded. For example, an image processing apparatus includes a patch generation unit which generates a patch by projecting a part of a connection component constituted by points that are included in a point group representing a three-dimensional structure, located adjacent to each other, and projected in an identical direction. In this case, the part of the connection component is projected in a projection direction updated on the basis of the part of the connection component, and generates a patch by projecting the other part of the connection component in a projection direction set on the basis of the entire connection component, and a coding unit which codes a frame image where the patches generated by the patch generation unit are arranged.

This configuration allows projection of each of partial regions within the small region in a more preferable direction (i.e., in such a direction where the number of points lost by projection decreases), and therefore reduces a loss caused by projection. Accordingly, reduction of subjective image quality deterioration of a display image is achievable.

Note that Method 1 needs to be applied to both coding (Enc) and decoding (Dec) to implement Method 1 as described above as presented in a table of FIG. 3. Similarly, Method 2 needs to be applied to both coding (Enc) and decoding (Dec) to implement Method 2. Similarly, Method 3 needs to be applied to both coding (Enc) and decoding (Dec) to implement Method 3. However, Method 4 is only required to be applied to coding (Enc) to implement Method 4.

Moreover, as presented in the table of FIG. 3, deterioration of subjective image quality caused by a projection loss can be reduced by applying any of Method 1 to Method 4.

Note that Method 3 may be applied in combination with Method 1 or Method 2 as presented in the table of FIG. 3. Moreover, Method 4 may be applied in combination with Method 1, Method 2, or Method 3 as presented in the table of FIG. 3. Furthermore, Method 4 may be applied in combination with Method 1 and Method 3. In addition, Method 4 may be applied in combination with Method 2 and Method 3.

Note that Method 1 and Method 2 may be exclusively applied to each point of a point cloud.

Moreover, as presented in a table of FIG. 4, the sub patch of attribute information (Texture Video) may be omitted in the case of application of Method 1. Furthermore, the partial patch of attribute information may be omitted in the case of application of Method 2. In addition, the occupancy map (Occupancy Video) associated with the partial patch may be omitted. Besides, Missed Patch of attribute information may be omitted in the case of application of Method 3. In this manner, a coding efficiency drop can be reduced.

2. First Embodiment

Method 1

Figure 5B:
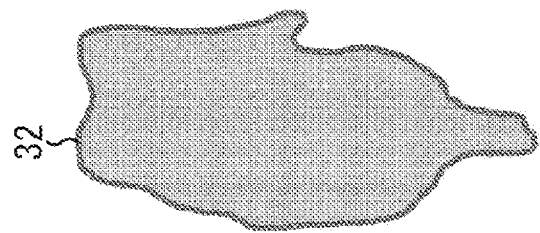
FIGS. 5A and 5B depict diagrams explaining an example of a sub patch.
Figure 5A:
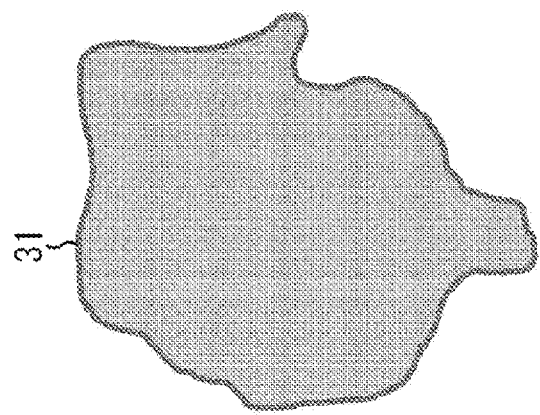

The respective methods will be subsequently described. Method 1 will be explained in the present embodiment. In the case of Method 1, a connection component (3D data (point group) of small region) is also projected in a direction different from a projection direction of a main patch to generate a sub patch. For example, a connection component corresponding to a main patch 31 depicted in a part FIG. 5A is projected in a different direction to generate a sub patch 32 depicted in FIG. 5B.

The main patch for which the sub patch is to be generated may be any patch. For example, the sub patch may be generated for all main patches. Moreover, the sub patch may be generated only for a main patch meeting a predetermined condition. This condition may be any condition. Furthermore, the projection direction of the sub patch may be any direction as long as the direction is different from the projection direction of the main patch. In addition, a method for determining the projection direction of the sub patch may be any method. The number of the sub patches generated for one main patch may be any number. This number may be one or more than one. The numbers of the sub patches for the respective main patches may be either equalized or not equalized. A method for determining this number of the sub patches may be any method.

For example, in a case where a patch (main patch) contains a large number of points each having a normal direction different from a projection direction, a patch (sub patch) may be generated also in a different projection direction. For example, it is allowed to derive an inner product of a normal vector of each of points and a vector in a projection direction of each main patch, designate points each having a smaller inner product than a predetermined reference as candidates, and generates a sub patch for each main patch which contains a larger number of candidates (larger number of points) than a predetermined threshold. In this case, the projection direction of the sub patch may be separately obtained, or may be determined beforehand.

Moreover, for example, it is allowed to derive an inner product of a normal vector of each of points of a small region (connection component) corresponding to each main patch and each of vectors in six directions (e.g., up, down, left, right, front, and rear) as candidates of the projection direction, evaluate each of the directions on the basis of the inner product thus obtained, and designate, as the projection direction of the sub patch, a direction corresponding to the second highest evaluation next to the projection direction of the main patch as a direction given the highest evaluation. For example, it is allowed to designate points each having a larger inner product obtained as described above than a predetermined reference value as candidates, derive the number of candidates for each of the six directions, and designates, as the projection direction of the sub patch, the direction corresponding to the second largest number of candidates next to the projection direction of the main patch (the sub patch may be generated by projection in this direction).

In addition, in a case where a plurality of sub patches (e.g., N sub patches (N: natural number)) is allowed to be generated for one main patch, each of N directions may be designated as the projection direction of the sub patch (N sub patches may be generated by projection in the respective directions) in a descending order of the number of candidates. Moreover, all of the directions each corresponding to a larger number of candidates than a predetermined threshold may be designated as projection directions of the sub patch (the sub patch may be generated by projection in the respective directions).

Note that the sub patch may be generated only for position information (geometry), and may be omitted (not generated) for attribute information (attribute or Texture). In this manner, an increase in a code quantity (coding efficiency drop) resulting from generation of the sub patch can be reduced. In this case, attribute information associated with the sub patch is generated on the basis of attribute information associated with the corresponding main patch at the time of decoding.

The sub patch is arranged in a frame image (two-dimensional image) similarly to the main patch. At this time, the sub patch may be interlaced and arranged while separated into a plurality of parts for each row or column. For example, the sub patch 32 depicted in FIG. 6A may be separated into a portion of odd-number columns and a portion of even-number columns to be arranged in a frame image as an odd-number column sub patch 33 and an even-number column sub patch 34 as depicted in FIG. 6B. Moreover, for example, the sub patch 32 may be separated into a portion of odd-number rows and a portion of even-number rows to be arranged in a frame image as an odd-number row sub patch 35 and an even-number row sub patch 36 as depicted in FIG. 6C.

Generally, in a point cloud (point group) as 3D data, position information at each point is quantized using a voxel or the like. Accordingly, points are arranged with regularity, and are disposed stepwise in a strict sense even in a flat portion, with minute recesses and protrusions possibly formed on the surface. When this point group is projected, the stepwise arrangement may be reflected in a patch depending on the projection direction, and a high-frequency component (cyclic change) may be produced in the patch. The high-frequency component thus produced may lower coding efficiency. This coding efficiency drop can be reduced by the interlace process (separation into odd-number rows (columns) and even-number rows (columns) described above) which separates the points into highly correlated groups of points.

Note that the respective sub patches separated in the manner described above may be arranged in layers different from each other. For example, as depicted in FIG. 6D, the odd-number column sub patch 33 (FIG. 6B) may be arranged in a layer D0, while the even-number column sub patch 34 (FIG. 6B) may be arranged in a layer D1. Moreover, as depicted in FIG. 6E, the odd-number row sub patch 35 (FIG. 6C) may be arranged in the layer D0, while the even-number row sub patch 36 (FIG. 6C) may be arranged in the layer D1. In this manner, the respective sub patches are allowed to be arranged at the same position. Accordingly, arrangement of the sub patch can be more facilitated. Moreover, the occupancy map for the sub patch may be used for one sub patch after separation.

In addition, in the case where the sub patch is interlaced in this manner, it is sufficient if the sub patches extracted from a video frame (divided sub patches) at the time of decoding are integrated by performing reverse processing (deinterlace process) for the divided sub patches to generate the sub patch 32 (FIG. 6A).

Note that the main patch and the sub patch corresponding to each other are associated with an identical connection component, but have different projection directions. In this case, the main patch and the sub patch may have different points lost by projection. Accordingly, as depicted in FIG. 7, a point 42 corresponding to a point 41 of the sub patch 32 may be absent in the main patch. As described above, in a case where only the sub patch of position information is generated, attribute information associated with the point 42 corresponding to the point 41 is applied to attribute information associated with the point 41 at the time of decoding. In a case where the point 42 is absent in the main patch 31, the attribute information associated with the point 41 of the sub patch 32 is generated by using attribute information associated with a near point of the main patch.

The near point may be defined in any manners. For example, the near point may be a point located at a distance of a predetermined threshold or shorter to the point 42. (The near point may be derived by determination on the basis of the threshold.) At this time, the distance to the point 42 may be derived on the patch, or in a three-dimensional space. For example, the adjacent point may be a near point (u'n, v'n) of the point 42 (position (u, v) corresponding to the point 41) in the main patch 31. Alternatively, the near point may be a near point $(x'_n, y'_n, z'_n)$ of a position (x, y, z) of the point 42 in the three-dimensional space. A processing load required for deriving the near point on the patch is smaller. Accuracy of the near point derived in the three-dimensional space is higher. Note that the number of the near points may be any number. This number may be one or more than one.

A method for utilizing attribute information associated with the near point may be any method. For example, in a case where the distance from the near point to the point 42 is 0 (in a case where a nearest point and the point 42 are almost aligned), attribute information associated with the nearest point may be applied (copied) to the attribute information associated with the point 41 of the sub patch 32. Moreover, in a case where a plurality of near points is present, attribute information associated with the nearest point closest to the point 42 may be applied (copied) to the attribute information associated with the point 41 of the sub patch 32. Furthermore, the attribute information associated with the point 41 of the sub patch 32 may be derived using attribute information associated with each of derived near points. For example, an average value of the attribute information associated with the respective near points may be applied to attribute information associated with the point 41 of the sub patch 32.

<Coding Device>

Figure 8:
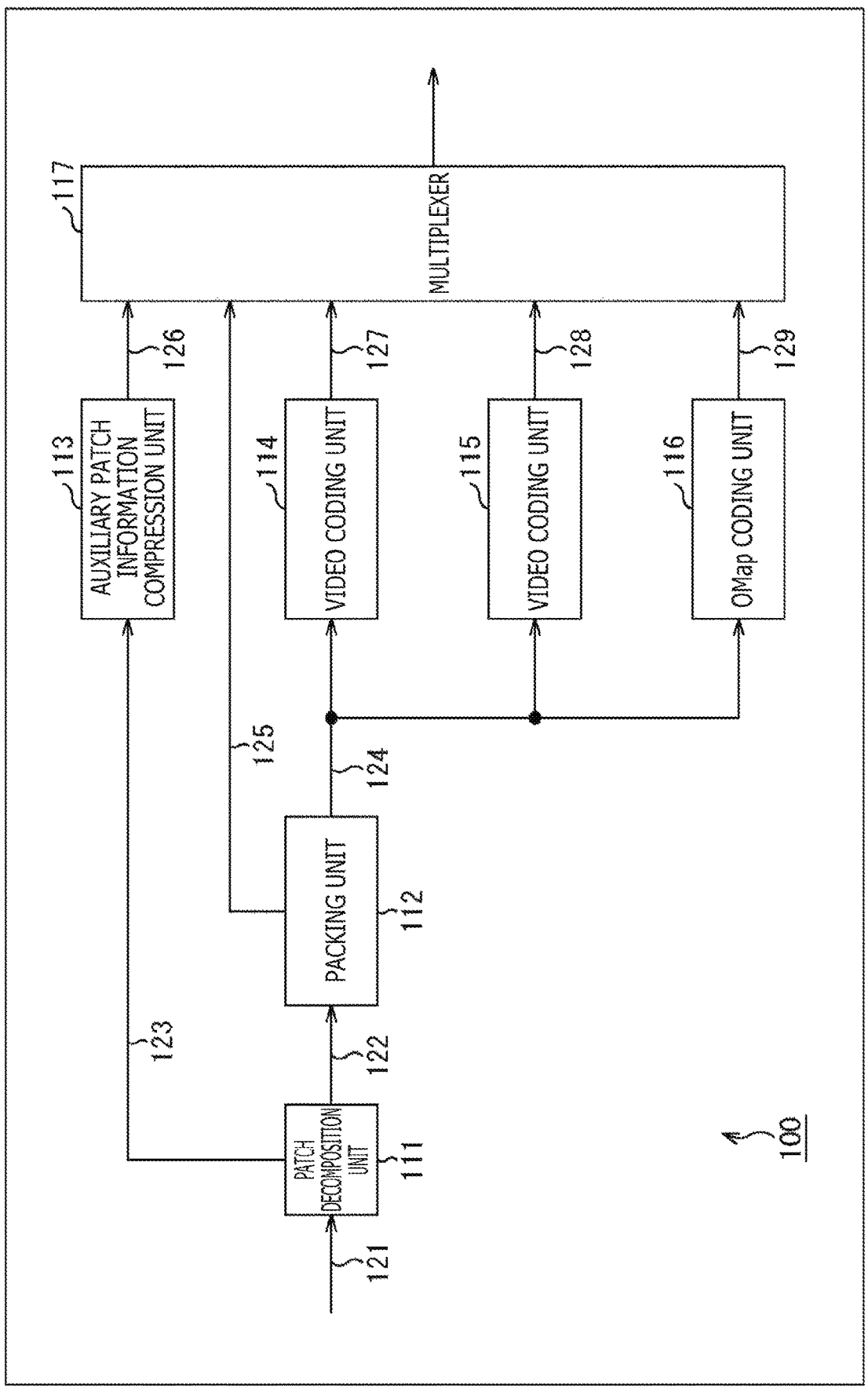
FIG. 8 is a block diagram depicting a main configuration example of a coding device.

FIG. 8 is a block diagram depicting an example of a configuration of a coding device in one mode of an image processing apparatus to which the present technology is applied. A coding device 100 depicted in FIG. 8 is a device (a coding device to which the video-based approach is applied) which projects 3D data such as a point cloud on a two-dimensional plane and codes the 3D data using a coding method for two-dimensional images.

Note that FIG. 8 presents main processing units and data flows, and does not necessarily contain all of processing units and data flows. Specifically, the coding device 100 may include a processing unit not depicted in the block in FIG. 8, or perform a process or a data flow not indicated by an arrow or the like in FIG. 8.

As depicted in FIG. 8, the coding device 100 includes a patch decomposition unit 111, a packing unit 112, an auxiliary patch information compression unit 113, a video coding unit 114, a video coding unit 115, an OMap coding unit 116, and a multiplexer 117.

The patch decomposition unit 111 performs processing associated with decomposition of 3D data. For example, the patch decomposition unit 111 acquires 3D data (e.g., point cloud) representing a three-dimensional structure and input to the coding device 100 (arrow 121). Moreover, the patch decomposition unit 111 decomposes the acquired 3D data into a plurality of small regions (connection components), and projects the 3D data on a two-dimensional plane for each of the small regions to generate a patch of position information and a patch of attribute information.

The patch decomposition unit 111 supplies information associated with the respective generated patches to the packing unit 112 (arrow 122). Moreover, the patch decomposition unit 111 supplies auxiliary patch information which is information associated with the decomposition to the auxiliary patch information compression unit 113 (arrow 123).

The packing unit 112 performs processing associated with packing of data. For example, the packing unit 112 acquires information associated with the patches supplied from the patch decomposition unit 111 (arrow 122). Moreover, the packing unit 112 arranges the respective acquired patches in a two-dimensional image to pack the patches into a video frame. For example, the packing unit 112 packs a patch of position information (Geometry) indicating positions of points into a video frame to generate a geometry video frame or frames. Moreover, the packing unit 112 packs a patch of attribute information (Texture) indicating color information or the like added to the position information into a video frame to generate a color video frame or frames. Furthermore, the packing unit 112 generates an occupancy map indicating the presence or absence of a patch.

The packing unit 112 supplies these to processing units in the following stages (arrow 124). For example, the packing unit 112 supplies the geometry video frame to the video coding unit 114, supplies the color video frame to the video coding unit 115, and supplies the occupancy map to the OMap coding unit 116. Moreover, the packing unit 112 supplies control information associated with this packing to the multiplexer 117 (arrow 125).

The auxiliary patch information compression unit 113 performs processing associated with compression of auxiliary patch information. For example, the auxiliary patch information compression unit 113 acquires auxiliary patch information supplied from the patch decomposition unit 111 (arrow 123). The auxiliary patch information compression unit 113 codes (compresses) the acquired auxiliary patch information. The auxiliary patch information compression unit 113 supplies coded data of the acquired auxiliary patch information to the multiplexer 117 (arrow 126).

The video coding unit 114 performs processing associated with coding of a geometry video frame. For example, the video coding unit 114 acquires a geometry video frame supplied from the packing unit 112 (arrow 124). Moreover, the video coding unit 114 codes the acquired geometry video frame using any coding method for two-dimensional images, such as AVC and HEVC. The video coding unit 114 supplies coded data of the geometry video frame obtained by the coding to the multiplexer 117 (arrow 127).

The video coding unit 115 performs processing associated with coding of a color video frame. For example, the video coding unit 115 acquires a color video frame supplied from the packing unit 112 (arrow 124). Moreover, the video coding unit 115 codes the acquired color video frame using any coding method for two-dimensional images, such as AVC and HEVC. The video coding unit 115 supplies coded data of the color video frame obtained by the coding to the multiplexer 117 (arrow 128).

The OMap coding unit 116 performs processing associated with coding of a video frame of an occupancy map. For example, the OMap coding unit 116 acquires an occupancy map supplied from the packing unit 112 (arrow 124). Moreover, the OMap coding unit 116 codes the acquired occupancy map using any coding method such as arithmetic coding. The OMap coding unit 116 supplies coded data of the occupancy map obtained by the coding to the multiplexer 117 (arrow 129).

The multiplexer 117 performs processing associated with multiplexing. For example, the multiplexer 117 acquires coded data of auxiliary patch information supplied from the auxiliary patch information compression unit 113 (arrow 126). Moreover, for example, the multiplexer 117 acquires control information associated with packing and supplied from the packing unit 112 (arrow 125). Besides, for example, the multiplexer 117 acquires coded data of a geometry video frame supplied from the video coding unit 114 (arrow 127). Furthermore, for example, the multiplexer 117 acquires coded data of a color video frame supplied from the video coding unit 115 (arrow 128). In addition, for example, the multiplexer 117 acquires coded data of an occupancy map supplied from the OMap coding unit 116 (arrow 129).

The multiplexer 117 multiplexes respective pieces of the acquired information to generate a bit stream. The multiplexer 117 outputs the generated bit stream to the outside of the coding device 100.

Note that each of the processing units described above (patch decomposition unit 111 to multiplexer 117) has any configuration. For example, each of the processing units may be constituted by a logic circuit which implements the above processing. Moreover, each of the processing units may include a CPU (Central Processing Unit), a ROM (Read Only Memory), a RAM (Random Access Memory), and the like, for example, and implement the above processing by executing a program using these components. Needless to say, each of the processing units may have both of these configurations, and implement a part of the above processing using a logic circuit, and the other part of the above processing under a program. The configurations of the respective processing units may be independent of each other. For example, a part of each of the processing units may implement a part of the above processing using a logic circuit, another part of each of the processing units may implement the above processing by executing a program, and the remaining part of the processing units may implement the above processing using both the logic circuit and the program.

<Application of Method 1>

The coding device 100 described above projects a small region in a plurality of directions. For example, the patch decomposition unit 111 projects, on a two-dimensional plane in a plurality of directions, a connection component (small region) constituted by points that are included in a point group representing a three-dimensional structure, located adjacent to each other, and projected in an identical direction to generate patches in the respective directions. Moreover, the video coding unit 114 (and video coding unit 115) codes a frame image where the patches in the respective directions generated by the patch decomposition unit 111 are arranged.

This configuration allows projection of each partial region within the small region in a more preferable direction (i.e., in such a direction where the number of points lost by projection decreases), and therefore reduces a loss caused by projection. Accordingly, reduction of subjective image quality deterioration of a display image is achievable.

Moreover, the present technology (Method 1) described in <Method 1> of the present embodiment is applied to the coding device 100. For example, the patch decomposition unit 111 generates a main patch by projecting an entire connection component in a predetermined direction, and generates a sub patch by projecting the entire connection component in a direction different from the predetermined direction.

This configuration allows projection of the small region in a plurality of directions, and therefore achieves projection of each of the partial regions within the small region in a more preferable direction (i.e., in such a direction where the number of loss points produced by projection decreases), and therefore reduces a loss caused by projection. Accordingly, reduction of subjective image quality deterioration of a display image is achievable.

Needless to say, other aspects of the present technology associated with Method 1 described above in <Method 1> of the present embodiment may be applied to the coding device 100. In this case, advantageous effects similar to those described above in <Method 1> of the present embodiment are offerable.

<Flow of Coding Process>

Described will be a process executed by the coding device 100 in this case (coding device 100 to which Method 1 is applied). Initially described will be an example of a flow of a coding process with reference to a flowchart in FIG. 9.

At a start of the coding process, the patch decomposition unit 111 of the coding device 100 in step S101 executes a patch decomposition process to decompose 3D data into patches and project data of the respective patches on a two-dimensional plane.

In step S102, the auxiliary patch information compression unit 113 compresses auxiliary patch information obtained by processing in step S101. In step S103, the packing unit 112 packs 3D data projected from the patch decomposition unit 111 onto the two-dimensional plane for each patch to generate a geometry video frame or a color video frame. Moreover, the packing unit 112 generates an occupancy map.

In step S104, the video coding unit 114 codes the geometry frame obtained by processing in step S103 using a coding method for two-dimensional images. In step S105, the video coding unit 115 codes the color video frame obtained by processing in step S103 using a coding method for two-dimensional images. In step S106, the OMap coding unit 116 codes the occupancy map obtained by processing in step S103.

In step S107, the multiplexer 117 multiplexes respective pieces of information created as above to generate a bit stream containing these pieces of information. In step S108, the multiplexer 117 outputs the bit stream generated by processing in step S107 to the outside of the coding device 100. After completion of processing in step S108, the coding process ends.

<Flow of Patch Decomposition Process>

Figure 9:
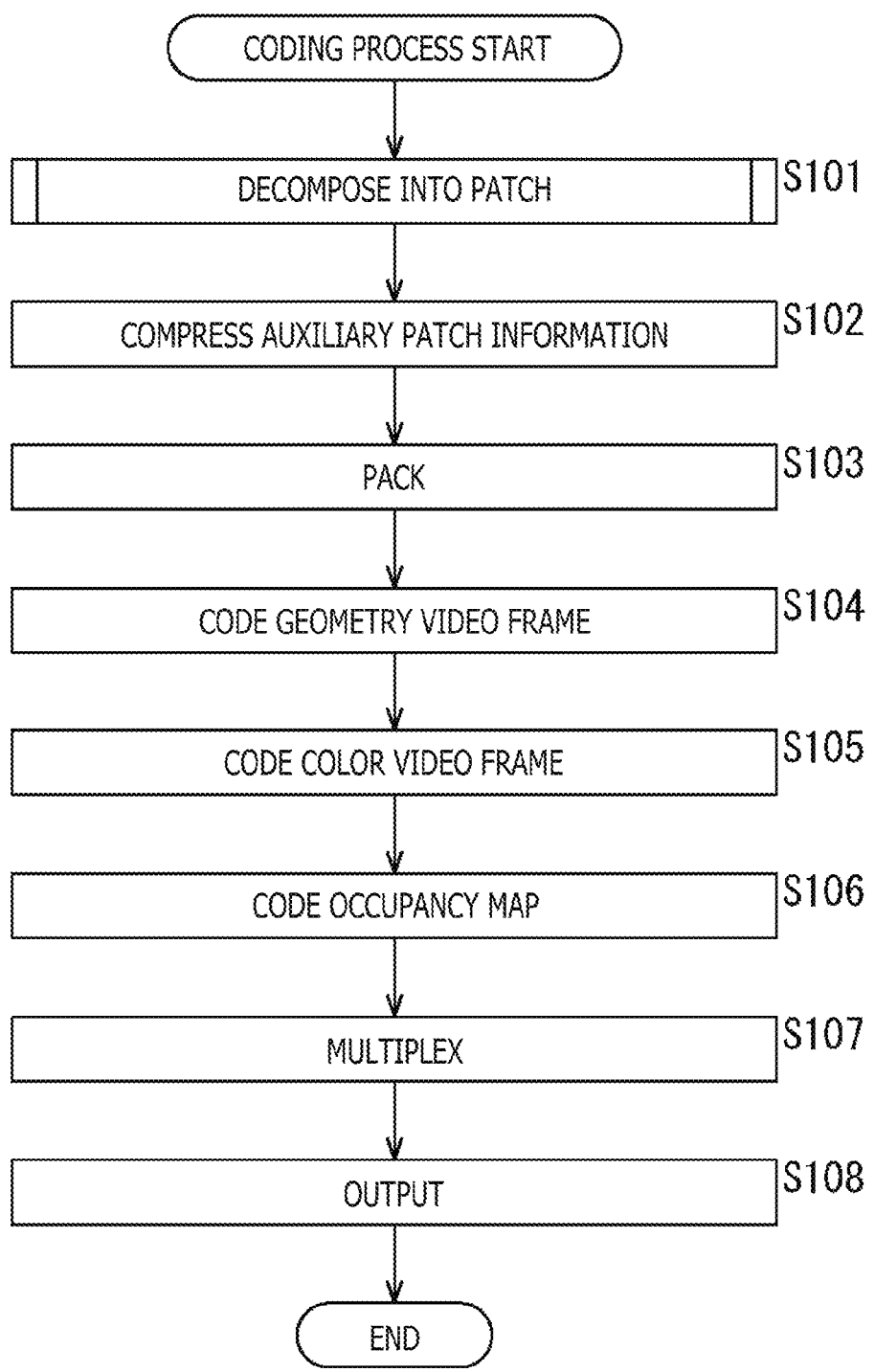
FIG. 9 is a flowchart explaining an example of a flow of a coding process.

Subsequently described with reference to a flowchart in FIG. 10 will be an example of a flow of the patch decomposition process executed in step S101 in FIG. 9.

At a start of the patch decomposition process, the patch decomposition unit 111 in step S121 estimate normal directions of respective points of a point cloud. In step S122, the patch decomposition unit 111 performs an initial division process. For example, the patch decomposition unit 111 selects a projection direction from six candidate directions (e.g., up, down, front, rear, left, and right) for each of the points, and classifies the respective points on the basis of the selected projection direction. In step S123, the patch decomposition unit 111 performs a division update process. For example, the patch decomposition unit 111 performs a smoothing process and the like to update classification of the respective points executed in step S122 as necessary.

In step S124, the patch decomposition unit 111 executes the patch division process to project the respective points on the two-dimensional plane in accordance with the above classification and generate patches. In step S125, the patch decomposition unit 111 selects any of the patches. In step S126, the patch decomposition unit 111 determines Missed Point which is a point lost by coding. After completion of processing in step S126, the patch decomposition process ends, and the process returns to FIG. 9.

<Flow of Patch Division Process>

Subsequently described with reference to a flowchart in FIG. 11 will be an example of a flow of the patch division process executed in step S124 in FIG. 10.

At a start of the patch division process, the patch decomposition unit 111 in step S141 generates, from a point cloud, connection components each of which is a set of points adjacent to each other and projected in an identical direction. For example, the patch decomposition unit 111 divides a point group classified by processing in steps S122 and S123 in FIG. 10 and projected in an identical direction into point groups each containing points adjacent to each other to generate connection components.

Figure 10:
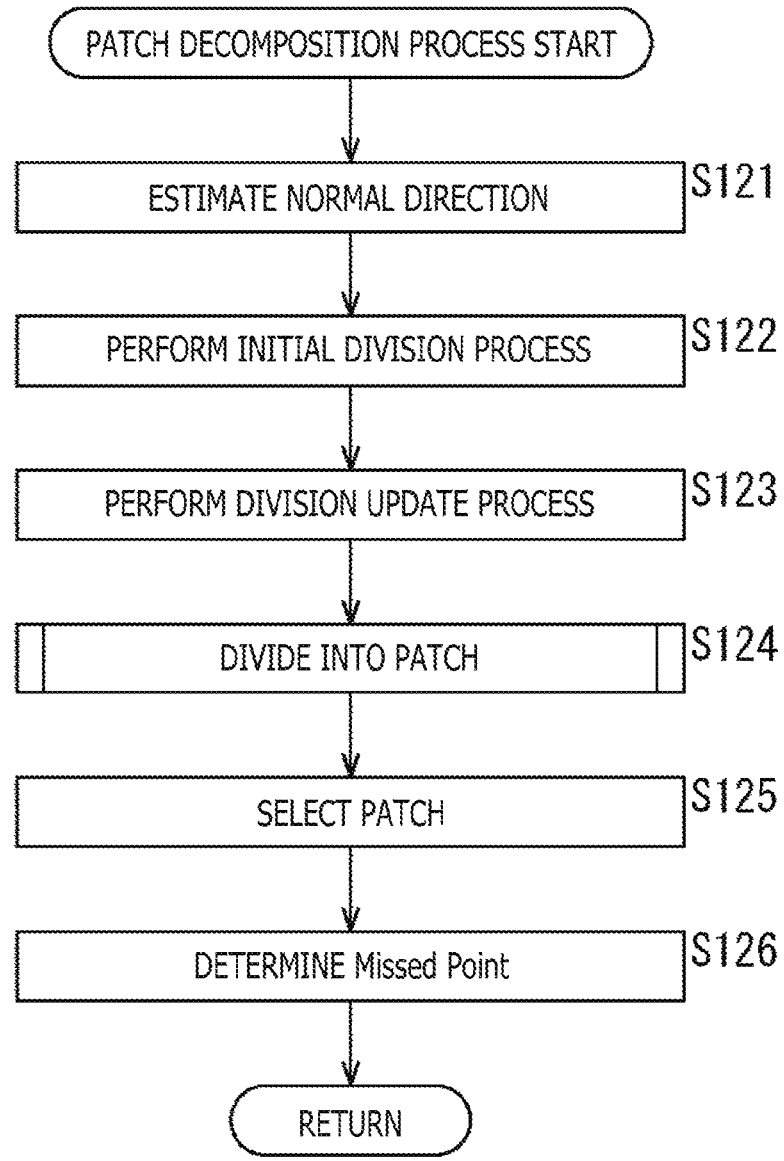
FIG. 10 is a flowchart explaining an example of a flow of a patch decomposition process.
Figure 11:
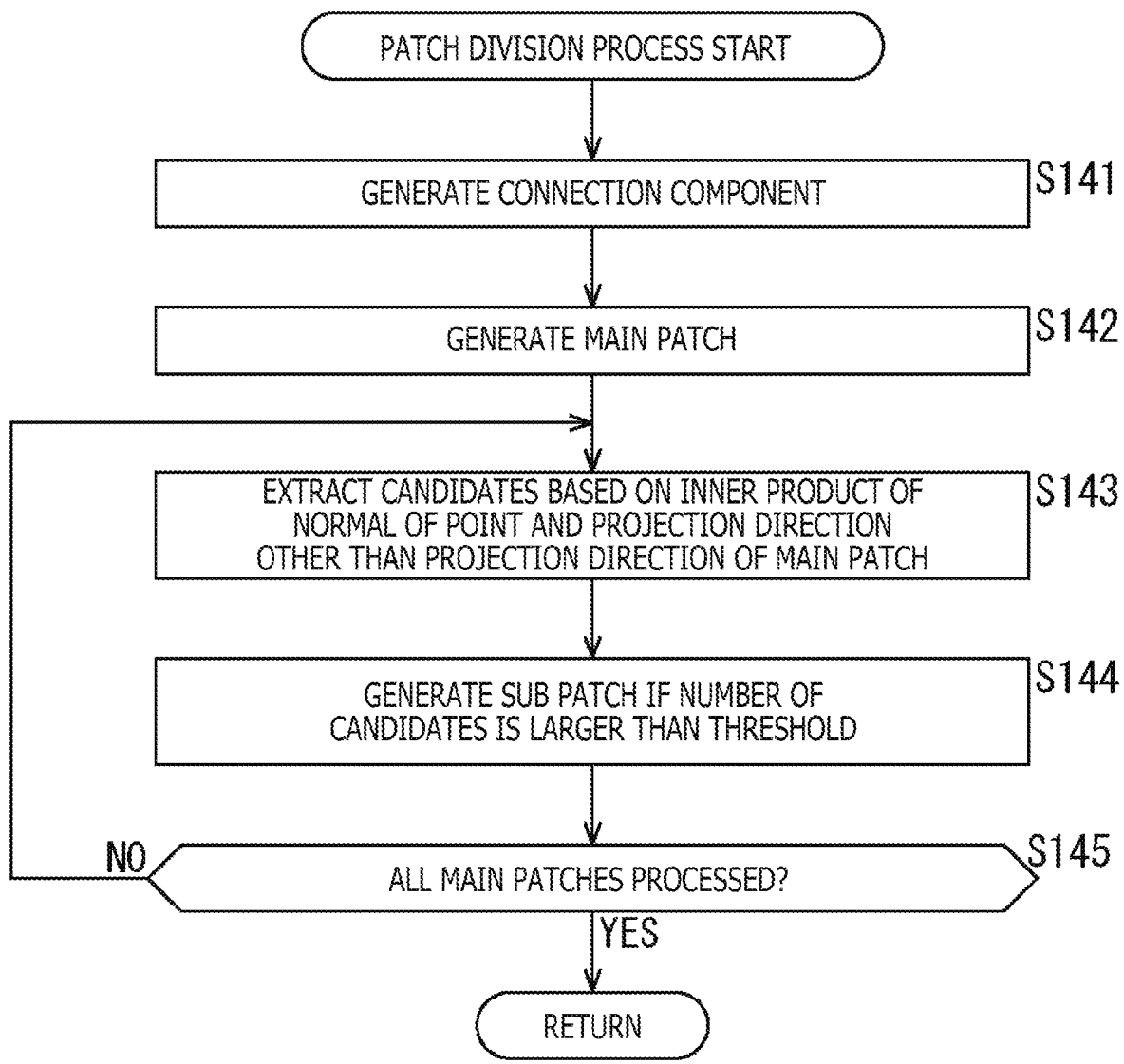
FIG. 11 is a flowchart explaining an example of a flow of a patch division process.

In step S142, the patch decomposition unit 111 projects each of the generated connection components on the two-dimensional plane in a projection direction set by processing in steps S122 and S123 in FIG. 10 to generate main patches.

In step S143, the patch decomposition unit 111 selects a main patch corresponding to a processing target from unprocessed main patches included in the generated main patches, derives an inner product of a normal vector and a vector in the projection direction for each point of the connection component corresponding to the main patch of the processing target, and extracts candidate points on the basis of the inner products. In step S144, the patch decomposition unit 111 generates a sub patch corresponding to the main patch in a case where the number of the candidate points of the main patch is larger than a predetermined threshold. A method for generating the sub patch may be any method. For example, the respective methods described in <Method 1> of the present embodiment may be applied.

In step S145, the patch decomposition unit 111 determines whether or not all of the main patches have been processed. In a case of determination that an unprocessed main patch is present, the process returns to step S143. Specifically, the patch decomposition unit 111 executes respective processing from step S143 to step S145 for each of the main patches. Thereafter, in a case of determination that all of the main patches have been processed in step S145, the patch division process ends, and the process returns to FIG. 10.

Projection of the small region in a plurality of directions is achievable by executing the respective processes in the manner described above. Accordingly, each of partial regions within the small region is allowed to be projected in a more preferable direction (i.e., in such a direction where the number of loss points produced by projection decreases). As a result, a loss caused by projection can be reduced. Accordingly, reduction of subjective image quality deterioration of a display image is achievable.

<Decoding Device>

Figure 12:
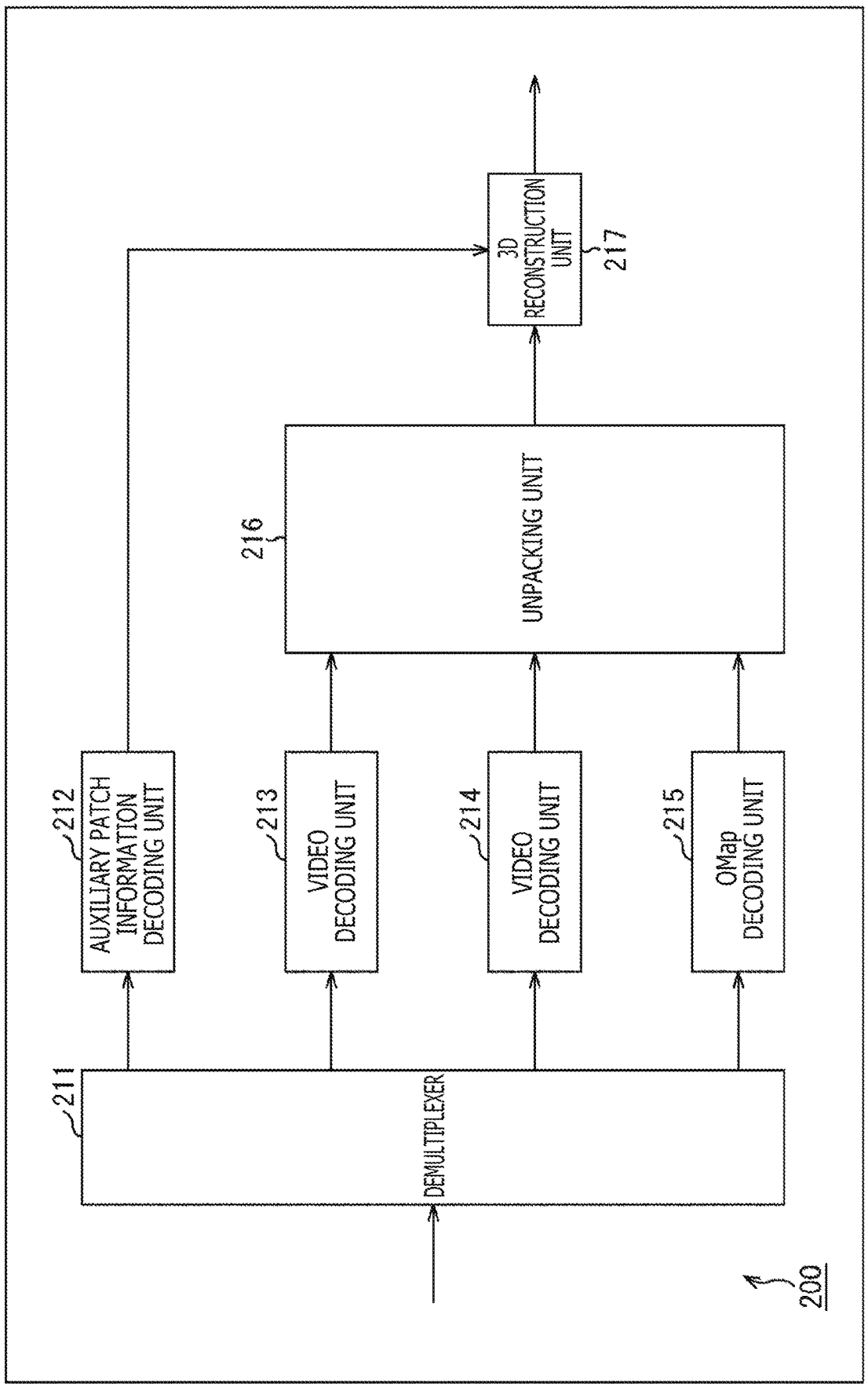
FIG. 12 is a block diagram depicting a main configuration example of a decoding device.

FIG. 12 is a block diagram depicting an example of a configuration of a decoding device in one mode of an image processing apparatus to which the present technology is applied. A decoding device 200 depicted in FIG. 12 is a device (a decoding device to which a video-based approach is applied) which decodes, using a decoding method for two-dimensional images, coded data obtained by projecting 3D data such as a point cloud on a two-dimensional plane and coding the 3D data, and reconstructs the 3D data. The decoding device 200 is a decoding device corresponding to the coding device 100 in FIG. 8, and is capable of decoding a bit stream generated by the coding device 100, and reconstructing 3D data.

Note that FIG. 12 presents main processing units and data flows, and does not necessarily contain all of processing units and data flows. Specifically, the decoding device 200 may include a processing unit not depicted in the block in FIG. 12, or perform a process or a data flow not indicated by an arrow or the like in FIG. 12.

As depicted in FIG. 12, the decoding device 200 includes a demultiplexer 211, an auxiliary patch information decoding unit 212, a video decoding unit 213, a video decoding unit 214, an OMap decoding unit 215, an unpacking unit 216, and a 3D reconstruction unit 217.

The demultiplexer 211 performs processing associated with demultiplexing of data. For example, the demultiplexer 211 acquires a bit stream input to the decoding device 200. For example, this bit stream is supplied from the coding device 100. The demultiplexer 211 demultiplexes the bit stream, extracts coded data of auxiliary patch information, and supplies this coded data to the auxiliary patch information decoding unit 212. Moreover, the demultiplexer 211 extracts coded data of a geometry video frame from the bit stream by demultiplexing, and supplies this coded data to the video decoding unit 213. Furthermore, the demultiplexer 211 extracts coded data of a color video frame from the bit stream by demultiplexing, and supplies this coded data to the video decoding unit 214. In addition, the demultiplexer 211 extracts coded data of an occupancy map from the bit stream by demultiplexing, and supplies this coded data to the OMap decoding unit 215. Besides, the demultiplexer 211 extracts control information associated with packing from the bit stream by demultiplexing, and supplies this information to the unpacking unit 216.

The auxiliary patch information decoding unit 212 performs processing associated with decoding of coded data of auxiliary patch information. For example, the auxiliary patch information decoding unit 212 acquires coded data of auxiliary patch information supplied from the demultiplexer 211. Moreover, the auxiliary patch information decoding unit 212 decodes the coded data to create auxiliary patch information. The auxiliary patch information decoding unit 212 supplies the auxiliary patch information to the 3D reconstruction unit 217.

The video decoding unit 213 performs processing associated with decoding of coded data of a geometry video frame. For example, the video decoding unit 213 acquires coded data of a geometry video frame supplied from the demultiplexer 211. Moreover, for example, the video decoding unit 213 decodes the coded data to generate the geometry video frame. The video decoding unit 213 supplies the geometry video frame to the unpacking unit 216.

The video decoding unit 214 performs processing associated with decoding of coded data of a color video frame. For example, the video decoding unit 214 acquires coded data of a color video frame supplied from the demultiplexer 211. Moreover, for example, the video decoding unit 214 decodes the coded data to generate the color video frame. The video decoding unit 214 supplies the color video frame to the unpacking unit 216.

The OMap decoding unit 215 performs processing associated with decoding of coded data of an occupancy map. For example, the OMap decoding unit 215 acquires coded data of an occupancy map supplied from the demultiplexer 211. Moreover, for example, the OMap decoding unit 215 decodes the coded data to generate the occupancy map. The OMap decoding unit 215 supplies the occupancy map to the unpacking unit 216.

The unpacking unit 216 performs processing associated with unpacking. For example, the unpacking unit 216 acquires control information associated with packing and supplied from the demultiplexer 211. Moreover, the unpacking unit 216 acquires a geometry video frame supplied from the video decoding unit 213. Furthermore, the unpacking unit 216 acquires a color video frame supplied from the video decoding unit 214. In addition, the unpacking unit 216 acquires an occupancy map supplied from the OMap decoding unit 215. The unpacking unit 216 unpacks a geometry video frame and a color video frame on the basis of acquired control information and occupancy map to extract patches or the like of position information and attribute information. The unpacking unit 216 supplies the patches and the like of the position information and the attribute information to the 3D reconstruction unit 217.

The 3D reconstruction unit 217 performs processing associated with reconstruction of 3D data. For example, the 3D reconstruction unit 217 acquires auxiliary patch information supplied from the auxiliary patch information decoding unit 212, and patches and the like of position information and attribute information supplied from the unpacking unit 216. Moreover, the 3D reconstruction unit 217 reconstructs 3D data (e.g., point cloud) on the basis of these information. The 3D reconstruction unit 217 outputs 3D data obtained by this processing to the outside of the decoding device 200.

For example, the 3D data is supplied to a display unit to display an image of the 3D data, recorded in a recording medium, or supplied to another device via communication.

Note that each of the processing units described above (demultiplexer 211 to 3D reconstruction unit 217) has any configuration. For example, each of the processing units may be constituted by a logic circuit which implements the above processing. Moreover, each of the processing units may include a CPU, a ROM, a RAM, and the like, for example, and implement the above processing by executing a program using these components. Needless to say, each of the processing units may have both of these configurations, and implement a part of the above processing using a logic circuit, and the other part of the above processing under a program. The configurations of the respective processing units may be independent of each other. For example, a part of each of the processing units may implement a part of the above processing using a logic circuit, another part of each of the processing units may implement the above processing by executing a program, and the remaining part of the processing units may implement the above processing using both the logic circuit and the program.

<Application to Method 1>

The decoding device 200 described above decodes coded data obtained by projecting a small region in a plurality of directions. For example, the video decoding unit 213 decodes coded data of a frame image where patches are arranged in a plurality of directions, the patches being generated by projecting, on a two-dimensional plane in respective directions, a connection component (small region) constituted by points that are included in a point group representing a three-dimensional structure, located adjacent to each other, and projected in an identical direction. Moreover, the 3D reconstruction unit 217 reconstructs a point group (a connection component of the point group) using patches in respective directions which are patches corresponding to an identical connection component and obtained by decoding coded data using the video decoding unit 213.

This configuration can correctly decode coded data obtained by projecting the small region in a plurality of directions to project each of partial regions within the small region in a more preferable direction (i.e., in such a direction where the number of points lost by projection decreases) at the time of coding, and therefore can reduce a loss caused by projection. Accordingly, reduction of subjective image quality deterioration of a display image is achievable.

Moreover, the present technology (Method 1) described in <Method 1> of the present embodiment is applied to the decoding device 200. For example, the video decoding unit 213 decodes coded data of a frame image where a main patch generated by projecting an entire connection component in a predetermined direction, and a sub patch generated by projecting the entire connection component in a direction different from the predetermined direction are arranged, and the 3D reconstruction unit 217 reconstructs a point group (a connection component of the point group) using a main patch and a sub patch corresponding to an identical connection component and obtained by decoding coded data using the video decoding unit 213.

This configuration can correctly decode coded data obtained by projecting the small region in a plurality of directions to project each of partial regions within the small region in a more preferable direction (i.e., in such a direction where the number of points lost by projection decreases) at the time of coding, and therefore can reduce a loss caused by projection. Accordingly, reduction of subjective image quality deterioration of a display image is achievable.

Needless to say, other aspects of the present technology associated with Method 1 described above in <Method 1> of the present embodiment may be applied to the decoding device 200. In this case, advantageous effects similar to those described above in <Method 1> of the present embodiment are offerable.

<Flow of Decoding Process>

Described will be a process executed by the decoding device 200 (decoding device 200 to which Method 1 is applied) in this case. Initially described will be an example of a flow of a decoding process with reference to a flowchart in FIG. 13.

At a start of the decoding process, the demultiplexer 211 of the decoding device 200 demultiplexes a bit stream in step S201. In step S202, the auxiliary patch information decoding unit 212 decodes coded data of auxiliary patch information extracted from the bit stream by processing in step S201.

In step S203, the video decoding unit 213 decodes coded data of a geometry video frame extracted from the bit stream by processing in step S201. In step S204, the video decoding unit 214 decodes coded data of a color video frame extracted from the bit stream by processing in step S201. In step S205, the OMap decoding unit 215 decodes coded data of an occupancy map extracted from the bit stream by processing in step S201.

In step S206, the unpacking unit 216 unpacks each of the geometry video frame and the color video frame on the basis of control information associated with packing and the occupancy map.

In step S207, the 3D reconstruction unit 217 executes a point cloud reconstruction process, and reconstructs 3D data such as a point cloud on the basis of auxiliary patch information obtained in step S202, and various types of information obtained in step S206. After completion of processing in step S207, the decoding process ends.

<Flow of Point Cloud Reconstruction Process>

Subsequently described with reference to a flowchart in FIG. 14 will be an example of a flow of the point cloud reconstruction process executed in step S207 in FIG. 13.

At a start of the point cloud reconstruction process, the 3D reconstruction unit 217 in step S221 selects an unprocessed main patch of position information as a processing target. In step S222, the 3D reconstruction unit 217 determines whether or not a sub patch corresponding to the main patch as the processing target is present.

In a case of determination that a sub patch corresponding to a connection component identical to that of the main patch as the processing target is present, the process proceeds to step S223. In step S223, the 3D reconstruction unit 217 reconstructs the connection component on the basis of the main patch as the processing target and the sub patch corresponding to the main patch. After completion of processing in step S223, the process proceeds to step S225.

In step S222, in a case of determination that a sub patch corresponding to the connection component of the main patch as the processing target is absent, the process proceeds to step S224. In step S224, the 3D reconstruction unit 217 reconstructs the connection component on the basis of the main patch as the processing target. After completion of processing in step S224, the process proceeds to step S225.

In step S225, the 3D reconstruction unit 217 reconfigures texture of each point of the reconstructed connection component on the basis of a main patch of attribute information corresponding to the main patch of the position information as the processing target (or a main patch and a sub patch of attribute information corresponding to the main patch of position information as the processing target).

In step S226, the 3D reconstruction unit 217 determines whether or not a point given no attribute information is present. In a case of determination that a point given no attribute information is present in processing in step S225, the process proceeds to step S227.

In step S227, the 3D reconstruction unit 217 searches a near point close to the point given no attribute information on the basis of the main patch of position information, and creates (complements) attribute information associated with the point given no attribute information using attribute information associated with the near point. A method for complementing the attribute information may be any method. For example, the respective methods described above in <Method 1> of the present embodiment may be applied. After completion of this processing, the process proceeds to step S228.

In step S228, the 3D reconstruction unit 217 determines whether or not all of main patches of position information have been completed. In a case of determination that an unprocessed main patch is present, the flow returns to step S221. Specifically, respective processes from step S221 to step S228 are executed for each of the main patches of the position information as necessary. Thereafter, in a case of determination that all of the main patches have been processed in step S228, the process proceeds to step S229.

In step S229, the 3D reconstruction unit 217 processes Missed Point.

Figure 13:
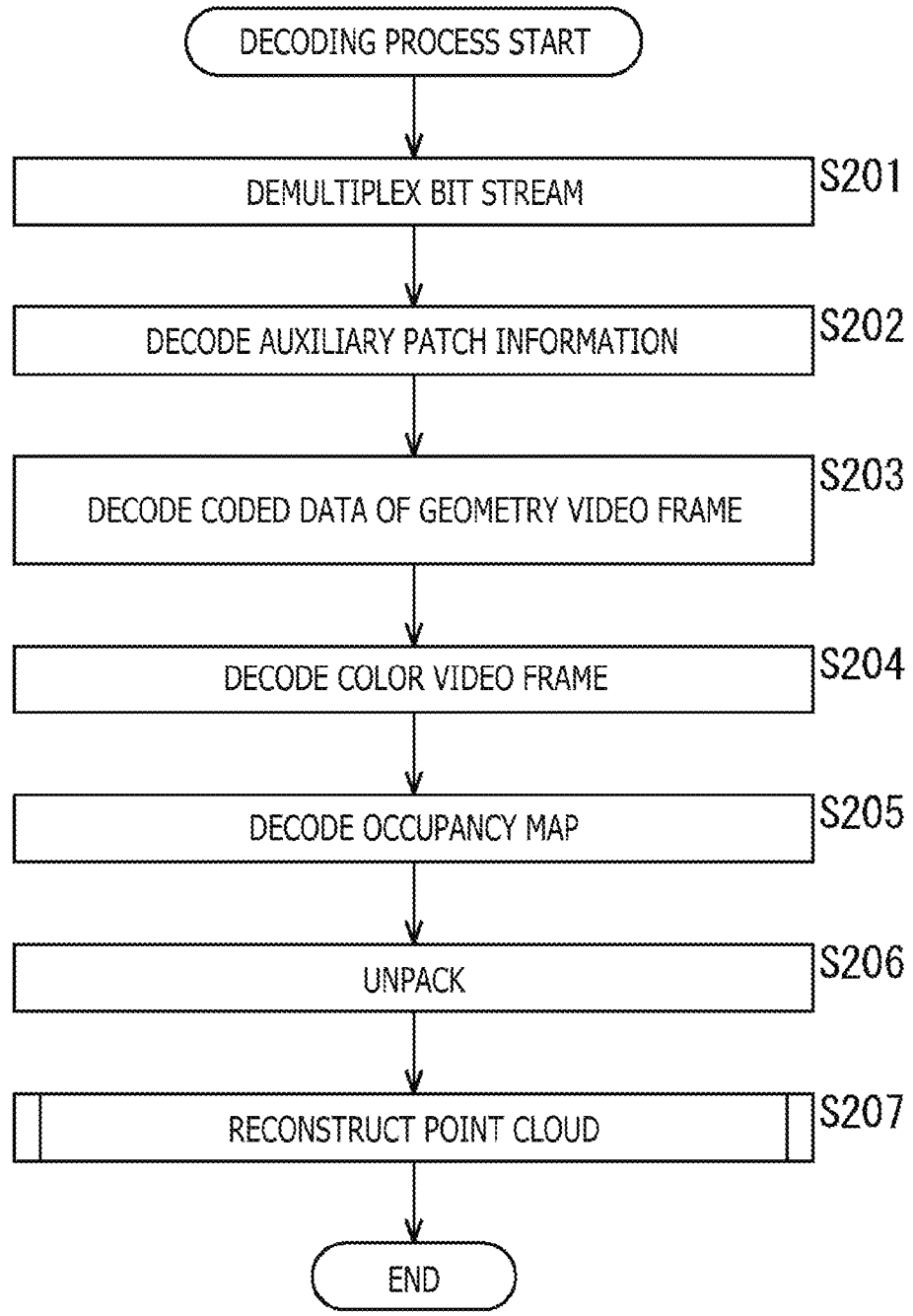
FIG. 13 is a flowchart explaining an example of a flow of a decoding process.
Figure 14:
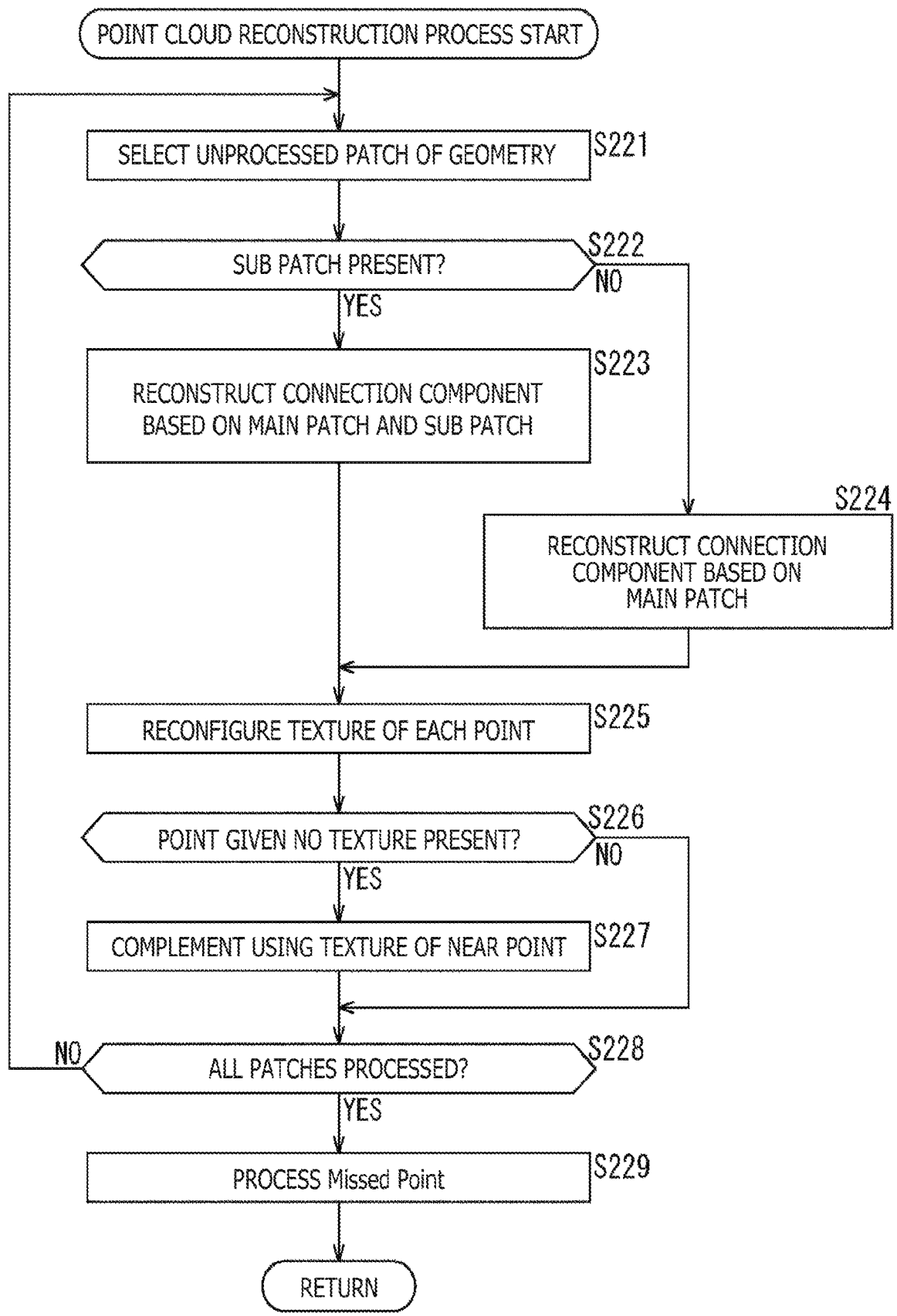
FIG. 14 is a flowchart explaining an example of a flow of a point cloud reconstruction process.

After completion of processing in step S229, the point cloud reconstruction process ends, and the process returns to FIG. 13.

The respective processes executed in the manner described above achieve correct decoding of coded data obtained by projecting a small region in a plurality of directions at the time of coding, and projecting each of partial regions within the small region in a more preferable direction (i.e., in such a direction where the number of points lost by projection decreases), and thus reduce a loss caused by projection. Accordingly, reduction of subjective image quality deterioration of a display image is achievable.

3. Second Embodiment

<Method 2>

Method 2 will be explained in the present embodiment. In the case of Method 2, for generating a patch by projecting an entire connection component (3D data (point group) of a small region) in a predetermined direction, a partial patch projected in a direction different from the direction of the patch and containing a point highly unlikely to be contained in the patch (point highly likely to be lost) is generated.

At this time, a rectangular partial region as viewed in the projection direction may be generated as the partial patch. For example, in the case of FIG. 15, a partial patch 321 is generated for a patch 310 projected on a two-dimensional plane 301 in a predetermined projection direction. The partial patch 321 is a patch generated by projecting, on a two-dimensional plane in a projection direction different from the projection direction of the patch 310, a partial region which contains a point included in a connection component corresponding to the patch 310 and highly unlikely to be contained in the patch 310 (a point highly likely to be lost). At this time, the partial region is defined such that the partial patch 321 becomes a rectangular region in the two-dimensional plane. Note that the partial region corresponds to a partial region 311 of the patch 310.

The partial patch 321 constituted by a rectangular region as described above can be represented by a length ($v_{add}$) in the vertical direction, a length ($u_{add}$) in the horizontal direction, and coordinates (x, y). Accordingly, information indicating a range of the partial patch is transferrable (codable) as auxiliary patch information (Aux Info). In this case, an occupancy map of the partial patch is unnecessary. As a result, reduction of a coding efficiency drop is achievable. Note that the shape of the partial patch is not limited to a rectangular shape but may be any shape as long as transfer of information indicating the range as auxiliary patch information (Aux Info) is achievable.

A method for defining this range of the partial patch (the range of the partial region of the connection component corresponding to the partial patch) may be any method. For example, a partial region may be defined ($v_{add}$, $u_{add}$, and x and y may be set) so as to contain a region where variations of normal directions at respective points are relatively large (e.g., a region where these variations are larger than a predetermined threshold) in the connection component. For example, an inner product of a normal vector at each point and a vector in a projection direction of a patch may be derived, and a partial region may be defined on the basis of a size of a variation of the derived value. Moreover, for example, points each having a value of the inner product smaller than a predetermined threshold may be extracted as candidates, and a partial region may be defined so as to contain these candidate points.

Furthermore, the partial region may be defined so as to contain a range corresponding to a predetermined characteristic which easily produces a loss of points in the patch in the connection component. For example, as depicted in FIG. 16, a partial patch may be applied to a boundary between patches. In the case of an example depicted in FIG. 16, a partial region 311 corresponding to the partial patch 321 is defined so as to contain boundaries between a patch 331, a patch 332, and a patch 333.

Furthermore, the projection direction of the partial region may be any direction as long as the direction is different from the projection direction of the patch. In addition, a method for determining the projection direction of the partial patch may be any method. For example, the projection direction of the partial region may be set on the basis of each point (a normal direction of each point) contained in the partial region defined as described above. Specifically, for example, the projection direction may be set on the basis of candidate points derived in the manner described above, and the partial region may be defined so as to contain the candidate points, and such that the partial patch becomes a rectangular region in the two-dimensional plane in the projection direction.

Moreover, the number of partial patches corresponding to one patch (one connection component) may be any number. This number may be one or more than one. Specifically, any number of partial regions are allowed to be defined in one connection component to generate partial patches. The number of the partial patches for the respective patches (connection components) may be either equalized or not equalized. In a case where a plurality of partial patches is generated for one patch (one connection component), the projection directions of the respective partial patches are allowed to be set independent of each other.

Note that the partial patch may be generated only for position information (geometry), and may be omitted (not generated) for attribute information (attribute or Texture). In this manner, an increase in a code quantity (coding efficiency drop) resulting from generation of the partial patch can be reduced. In this case, the attribute information associated with the partial patch is generated on the basis of the attribute information associated with the corresponding patch at the time of decoding.

The partial patch is arranged in the frame image (two-dimensional image) similarly to the patch. At this time, the partial patch may be interlaced and arranged while separated into a plurality of parts for each row or column. For example, the partial patch 321 depicted in FIG. 17A may be separated into a portion of odd-number columns and a portion of even-number columns to be arranged in a frame image as an odd-number column partial patch 341 and an even-number column partial patch 342 as depicted in FIG. 17B. Moreover, for example, the partial patch 321 may be separated into a portion of odd-number rows and a portion of even-number rows to be arranged in a frame image as an odd-number row partial patch 343 and an even-number row partial patch 344 as depicted in FIG. 17C.

In this manner, separation into points of highly correlated groups can be achieved by the interlace process (separation into odd-number rows (columns) and even-number rows (columns) similarly to the case of the sub patch. Accordingly, reduction of a coding efficiency drop is achievable.

Note that the respective partial patches separated in the manner described above may be arranged in layers different from each other. For example, as depicted in FIG. 17D, the odd-number column partial patch 341 (FIG. 17B) may be arranged in a layer D0, while the even-number column partial patch 342 (FIG. 17B) may be arranged in a layer D1. Moreover, as depicted in FIG. 17E, the odd-number row partial patch 343 (FIG. 17C) may be arranged in the layer D0, while the even-number row partial patch 344 (FIG. 17C) may be arranged in the layer D1. In this manner, arrangement of the partial patch can be more facilitated similarly to the case of the sub patch. Moreover, the occupancy map corresponding to the partial patch can be used for one sub patch after separation.

In addition, in the case where the partial patch is interlaced in this manner, it is sufficient if the partial patch extracted from a video frame (divided partial patch) is integrated by performing reverse processing (deinterlace process) for the divided partial patch to generate the partial patch 321 at the time of decoding (FIG. 17A).

Note that the partial region of the connection component corresponding to the partial patch contains points highly likely to be lost in the patch as described above. Accordingly, points corresponding to the points of the partial patch may be absent in the original patch. When points corresponding to the points of the partial patch are absent in the original patch as described above in the case where only the partial patch of the position information is generated as described above, attribute information associated with the points of the partial patch is created using attribute information associated with a near point in the original patch.

The near point may be defined in any manners. For example, the near point may be a point located at a distance of a predetermined threshold or shorter to a point corresponding to a processing target of the partial patch (the near point may be derived by determination on the basis of the threshold). At this time, the distance to the point corresponding to the processing target may be derived on the patch, or in a three-dimensional space similarly to the case of the sub patch. Note that the number of the near points may be any number. This number may be one or more than one.

A method for utilizing attribute information associated with the near point may be any method. For example, in a case where the distance from the near point to the point corresponding to the processing target is 0 (in a case the nearest point and the position of the processing target are almost aligned), the attribute information associated with the nearest point may be applied (copied) to attribute information associated with the point of the processing target of the partial patch. Moreover, in a case where a plurality of near points is present, attribute information associated with the nearest point closest to the point of the processing target may be applied (copied) to the attribute information associated with the point as the processing target of the partial patch. Furthermore, the attribute information associated with the point corresponding to the processing target of the partial patch may be derived using attribute information associated with each of derived near points. For example, an average value of the attribute information associated with the respective near points may be applied to attribute information associated with the point corresponding to the processing target of the partial patch.

Figure 18B:
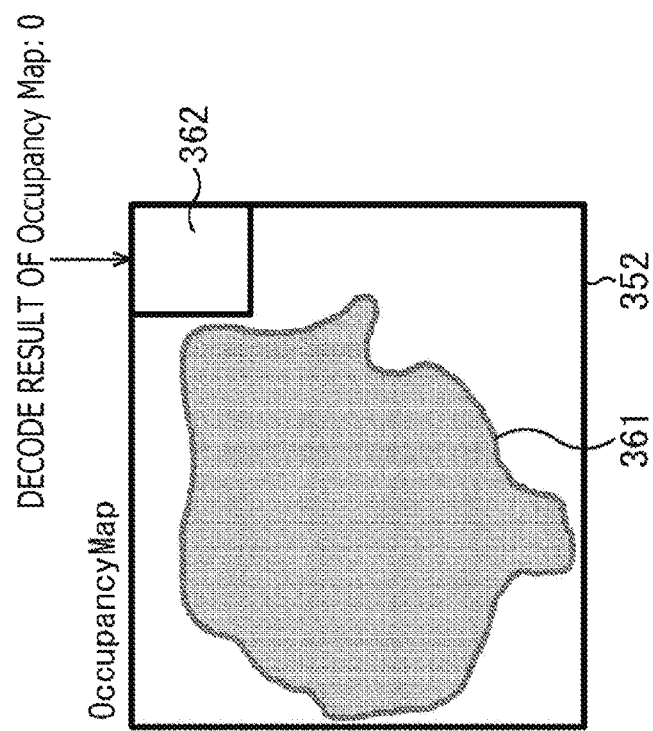
FIGS. 18A and 18B depict diagrams depicting an arrangement example of a partial region.
Figure 18A:
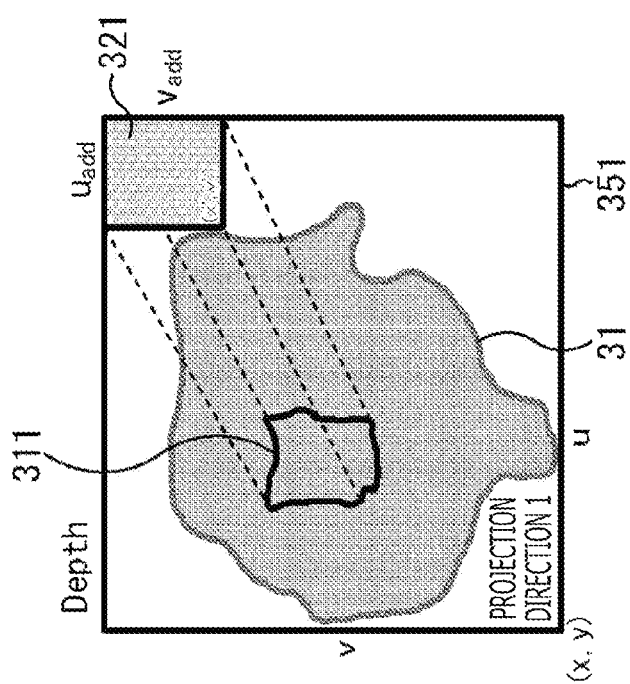

Moreover, the partial patch 321 defined as described above may be arranged at a predetermined position of a frame image 351 of position information as depicted in a FIG. 18A, for example, similarly to the original patch 310. In this case, in an occupancy map 352, a region 361 corresponding to the original patch 310 is set to a value "1," while a region 362 where the partial patch 321 is arranged is set to a value "0" as depicted in a FIG. 18B. Accordingly, it is assumed that the partial patch 321 is absent in the occupancy map. In this case, at the time of decoding, the region 362 where the partial patch 321 of the occupancy map is arranged is processed as the value "1" on the basis of information indicating a range of a partial patch contained in auxiliary patch information (Aux Info). Specifically, a range of horizontal uadd pixels and vertical vadd pixels from a start point of coordinates (x, y) in the occupancy map is processed as the value "1."

<Application of Method 2 to Coding Device>

The present technology (Method 2) described in <Method 2> of the present embodiment is applicable to the coding device 100 in FIG. 8. For example, the patch decomposition unit 111 generates a patch by projecting an entire connection component in a predetermined direction, and generates a partial patch by projecting a part of the connection component in a direction different from the predetermined direction.

In this manner, a partial region included in the small region and considered to be a region for which the projection direction for the entire small region is unpreferable is allowed to be projected also in a direction different from the projection direction. This partial region is therefore allowed to be projected in a more preferable direction (i.e., in such a direction where the number of points lost by projection decreases), and a loss caused by projection can thus be reduced. Accordingly, reduction of subjective image quality deterioration of a display image is achievable.

Needless to say, other aspects of the present technology associated with Method 2 described above in <Method 2> of the present embodiment may be applied to the coding device 100. In this case, advantageous effects similar to those described above in <Method 2> of the present embodiment are offerable.

<Flow of Coding Process>

The coding device 100 in this case (coding device 100 to which Method 2 is applied) performs a flow similar to the flow of the case described with reference to the flowchart in FIG. 9 to execute a coding process.

<Flow of Patch Decomposition Process>

The coding device 100 (coding device 100 to which Method 2 is applied) performs a flow similar to the flow of the case described with reference to the flowchart in FIG. 10 to execute a patch decomposition process.

<Flow of Patch Division Process>

Subsequently described with reference to a flowchart in FIG. 19 will be an example of a flow of a patch division process in this case executed in step S124 in FIG. 10.

At a start of the patch division process, the patch decomposition unit 111 in step S301 generates, from a point cloud, connection components each of which is a set of points adjacent to each other and projected in an identical direction. For example, the patch decomposition unit 111 divides a point group classified by processing in steps S122 and S123 in FIG. 10 and projected in an identical direction into point groups each containing points adjacent to each other to generate connection components.

In step S302, the patch decomposition unit 111 projects each of the generated connection components on the two-dimensional plane in a projection direction set by processing in steps S122 and S123 in FIG. 10 to generate a patch.

In step S303, the patch decomposition unit 111 selects a patch corresponding to a processing target from unprocessed patches included in generated patches, derives an inner product of a normal vector and a vector in a projection direction at each point of the connection component corresponding to the patch as the processing target, and extracts candidate points on the basis of the inner products. In step S304, the patch decomposition unit 111 defines a region containing the candidate points and a projection direction of the region to generate (add) a partial patch. A method for generating the partial patch may be any method. For example, the respective methods described in <Method 2> of the present embodiment may be applied.

In step S305, the patch decomposition unit 111 determines whether or not all of the patches have been processed. In a case of determination that an unprocessed patch is present, the flow returns to step S303. Specifically, the patch decomposition unit 111 executes respective processes from step S303 to step S305 for each of the patches. Thereafter, in a case of determination that all of the patches have been processed in step S305, the patch division process ends, and the process returns to FIG. 10.

The partial region included in the small region and considered to be a region for which the projection direction for the entire small region is unpreferable can be also projected in a direction different from the projection direction by executing the respective processes described above. Accordingly, the partial region can be projected in a more preferable direction (i.e., in such a direction where the number of points lost by projection decreases). As a result, a loss caused by projection can be reduced. Accordingly, reduction of subjective image quality deterioration of a display image is achievable.

<Application of Method 2 to Decoding Device>

The present technology (method 2) described in <Method 2> of the present embodiment is applicable to the decoding device 200 in FIG. 12. For example, the video decoding unit 213 decodes coded data of a frame image where a patch generated by projecting an entire connection component in a predetermined direction, and a partial patch generated by projecting a part of the connection component in a direction different from the predetermined direction are arranged. Moreover, the 3D reconstruction unit 217 reconstructs a point group using the patch and the partial patch obtained by decoding coded data using the video decoding unit 213.

This configuration can correctly decode coded data obtained by projecting the partial region included in the small region and considered to be a region for which the projection direction for the entire small region is unpreferable also in a direction different from the projection direction to project the partial region in a more preferable direction (i.e., in such a direction where the number of loss points produced by projection decreases) at the time of coding, and therefore can reduce a loss caused by projection. Accordingly, reduction of subjective image quality deterioration of a display image is achievable.

<Flow of Decoding Process>

The decoding device 200 in this case (decoding device 200 to which Method 2 is applied) performs a flow similar to the flow of the case described with reference to the flowchart in FIG. 13 to execute a decoding process.

<Flow of Point Cloud Reconstruction Process>

Figure 20:
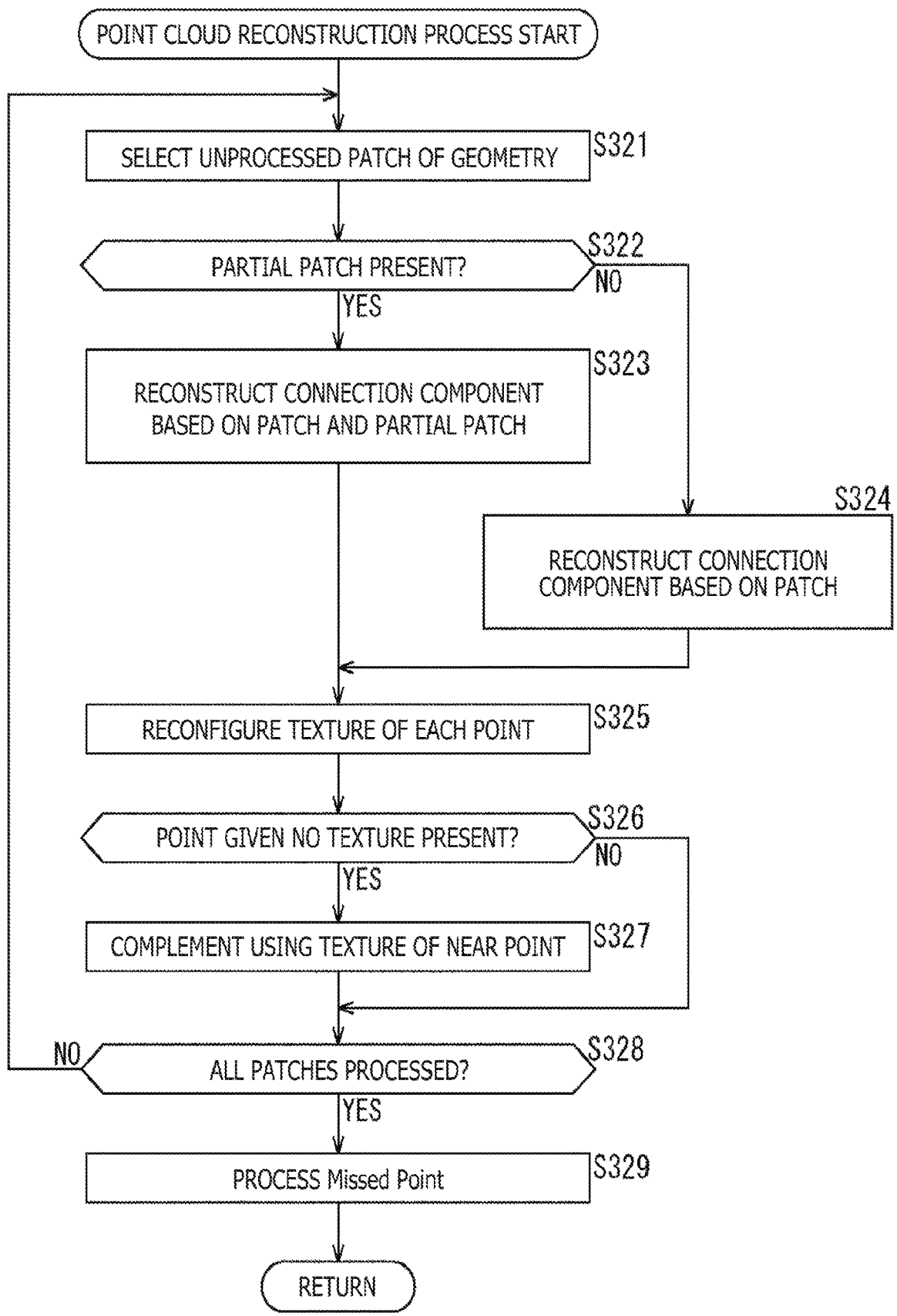
FIG. 20 is a flowchart explaining an example of a flow of a point cloud reconstruction process.

Subsequently described with reference to a flowchart in FIG. 20 will be an example of a flow of a point cloud reconstruction process in this case executed in step S207 in FIG. 13.

At a start of the point cloud reconstruction process, the 3D reconstruction unit 217 in step S321 selects an unprocessed patch of position information as a processing target. In step S322, the 3D reconstruction unit 217 determines whether or not a partial patch corresponding to the patch as the processing target is present.

In a case of determination that a partial patch corresponding to a connection component identical to that of the patch as the processing target is present, the process proceeds to step S323. In step S323, the 3D reconstruction unit 217 reconstructs the connection component on the basis of the patch as the processing target and the partial patch corresponding to the patch. After completion of processing in step S323, the process proceeds to step S325.

In addition, in a case of determination that a partial patch corresponding to the patch as the processing target is absent in step S322, the process proceeds to step S324. In step S324, the 3D reconstruction unit 217 reconstructs the connection component on the basis of the patch as the processing target. After completion of processing in step S324, the process proceeds to step S325.

In step S325, the 3D reconstruction unit 217 reconfigures texture of each point of the reconstructed connection component on the basis of a patch of attribute information corresponding to the patch of the position information as the processing target (or a patch and a partial patch of the attribute information corresponding to the patch of the position information as the processing target).

In step S326, the 3D reconstruction unit 217 determines whether or not a point given no attribute information is present. In a case of determination that a point given no attribute information is present in processing in step S325, the process proceeds to step S327.

In step S327, the 3D reconstruction unit 217 searches a near point located near the point given no attribute information on the basis of the patch of position information, and creates (complements) attribute information associated with the point given no attribute information using attribute information associated with the near point. A method for complementing the attribute information may be any method. For example, the respective methods described in <Method 2> of the present embodiment may be applied. After completion of this processing, the process proceeds to step S328.

In step S328, the 3D reconstruction unit 217 determines whether or not all of the patches of the position information have been processed. In a case of determination that an unprocessed patch is present, the flow returns to step S321. Specifically, respective processes from step S321 to step S328 are executed for each of the patches of the position information as necessary. Thereafter, in a case of determination that all of the patches have been processed in step S328, the process proceeds to step S329.

In step S329, the 3D reconstruction unit 217 processes Missed Point. After completion of processing in step S329, the point cloud reconstruction process ends, and the process returns to FIG. 13.

The respective processes executed in the manner described above achieve correct decoding of coded data obtained by projecting the partial region included in the small region and considered to be a region for which the projection direction for the entire small region is unpreferable in a direction different from the projection direction to project the partial region in a more preferable direction (i.e., in such a direction where the number of loss points produced by projection decreases) at the time of coding, and thus reduce a loss caused by projection. Accordingly, reduction of subjective image quality deterioration of a display image is achievable.

4. Third Embodiment

<Method 3>

Method 3 will be explained in the present embodiment. In the case of Method 3, information associated with a point lost by projection is transferred (coded) using Missed Patch. Missed Patch is a technology for losslessly (reversibly) coding position information and attribute information associated with points as image information. Point information is represented by EnhancedDeltaDepthCode, while attribute information is represented by a pixel value of Texture.

In this manner, a loss caused by projection can be reduced. Accordingly, reduction of subjective image quality deterioration of a display image is achievable.

Note that a method for selecting points requiring information transfer by using Missed Patch may be any method. For example, a point highly likely to be lost may be selected as a point requiring information transfer by using Missed Patch. For example, a point having a normal vector and a projection direction different from each other may be selected as a point requiring information transfer by using Missed Patch. For example, a point having a normal vector and a projection direction different from each other by a degree more than a threshold may be selected as a point requiring information transfer by using Missed Patch.

Moreover, a point adjacent to the foregoing points (or near point) may be selected as a point requiring information transfer by using Missed Patch. For example, a point within a predetermined range from the foregoing points (e.g., a distance of a predetermined threshold or shorter) may be selected as a point requiring information transfer by using Missed Patch.

Furthermore, a point located close to a surface of a three-dimensional structure body considerably affects deterioration of subjective image quality of a display image when lost. Accordingly, this point may be selected as a point requiring information transfer using Missed Patch. For example, a point within SurfaceThickness (point between layer D0 and layer D1) may be selected as a point requiring information transfer by using Missed Patch.

In addition, a point located close to a surface of a three-dimensional structure body and highly likely to be lost may be selected as a point requiring information transfer by using Missed Patch. For example, a difference from a point covered in a different projection direction may be selected as a point requiring information transfer by using Missed Patch. Specifically, a point contained in a patch projected in a certain direction but lost in a patch projected in a different direction may be selected as a point requiring information transfer by using Missed Patch. Even in the case of selection of a projection direction of a point from six directions (up, down, front, rear, left, and right), a larger number of directions such as ten directions and eighteen directions may be examined, and any one of the six directions may be selected on the basis of a result thus obtained. In this case, a difference between a point present in any of patches in the ten directions or the eighteenth directions (i.e., a point located close to the surface of the three-dimensional structure body) and a point absent in any of patches in the six directions (a point highly likely to be lost) may be selected as a point requiring information transfer by using Missed Patch.

Note that Missed Patch described above may be generated only for position information, and may be omitted for attribute information. In this manner, reduction of an increase in a code quantity (coding efficiency drop) is achievable.

In this case, attribute information associated with a point and transferred (coded) using Missed Patch is created using attribute information associated with a near point for this point.

The near point may be defined in any manners. For example, the near point may be a point located at a distance of a predetermined threshold or shorter to a point corresponding to a processing target (the near point may be derived by determination on the basis of the threshold). At this time, the distance to the point corresponding to the processing target may be derived on the patch, or in a three-dimensional space similarly to the case of the sub patch. Note that the number of the near points may be any number. This number may be one or more than one.

A method for utilizing attribute information associated with the near point may be any method. For example, in a case where the distance from the near point to the point corresponding to the processing target is 0 (in a case where the nearest point and the position of the processing target are almost aligned), attribute information associated with the nearest point may be applied (copied) to attribute information associated with the point as the processing target. Moreover, in a case where a plurality of near points is present, attribute information associated with the nearest point closest to the point as the processing target may be applied (copied) to the attribute information associated with the point as the processing target. Furthermore, the attribute information associated with the point corresponding to the processing target may be derived using attribute information associated with each of derived near points. For example, an average value of the attribute information associated with the respective near points may be applied to the attribute information associated with the point corresponding to the processing target.

<Application of Method 3 to Coding Device>

The present technology (Method 3) described in <Method 3> of the present embodiment is applicable to the coding device 100 in FIG. 8. For example, the patch decomposition unit 111 generates a patch by projecting, on a two-dimensional plane, a connection component constituted by points that are included in a point group representing a three-dimensional structure, located adjacent to each other, and projected in an identical direction, and generates Missed Patch containing information associated with a point which may be lost by projection of the connection component. Moreover, the video coding unit 114 codes a frame image where the patch generated by the patch decomposition unit 111 is arranged and Missed Patch.

In this manner, a loss caused by projection can be reduced. Accordingly, reduction of subjective image quality deterioration of a display image is achievable.

Needless to say, other aspects of the present technology associated with Method 3 described above in <Method 3> of the present embodiment may be applied to the coding device 100. In this case, advantageous effects similar to those described above in <Method 3> of the present embodiment are offerable.

<Flow of Coding Process>

The coding device 100 in this case (coding device 100 to which Method 3 is applied) performs a flow similar to the flow of the case described with reference to the flowchart in FIG. 9 to execute a coding process.

<Flow of Patch Decomposition Process>

Described with reference to a flowchart in FIG. 21 will be an example of a flow of a patch decomposition process executed in step S101 in FIG. 9 using the coding device 100 in this case (coding device 100 to which Method 3 is applied).

At a start of the patch decomposition process, the patch decomposition unit 111 in step S401 estimate normal directions of respective points of a point cloud. In step S402, the patch decomposition unit 111 performs an initial division process. For example, the patch decomposition unit 111 selects a projection direction from six candidate directions (e.g., up, down, front, rear, left, and right) for each of the points, and classifies each of the points on the basis of the selected projection direction. In step S403, the patch decomposition unit 111 performs a division update process. For example, the patch decomposition unit 111 performs a smoothing process and the like to update classification of the respective points executed in step S402 as necessary.

In step S404, the patch decomposition unit 111 executes the patch division process to project the respective points on the two-dimensional plane in accordance with the above classification and generate patches. In step S405, the patch decomposition unit 111 selects any of the patches. After completion of processing in step S405, the patch decomposition process ends, and the process returns to FIG. 9.

<Flow of Patch Division Process>

Subsequently described with reference to a flowchart in FIG. 22 will be an example of a flow of a patch division process executed in step S404 in FIG. 21.

At a start of the patch division process, the patch decomposition unit 111 in step S421 generates, from a point cloud, connection components each of which is a set of points adjacent to each other and projected in an identical direction. For example, the patch decomposition unit 111 divides a point group classified by processing in steps S402 and S403 in FIG. 21 and projected in an identical direction into point groups each containing points adjacent to each other to generate connection components.

Figure 21:
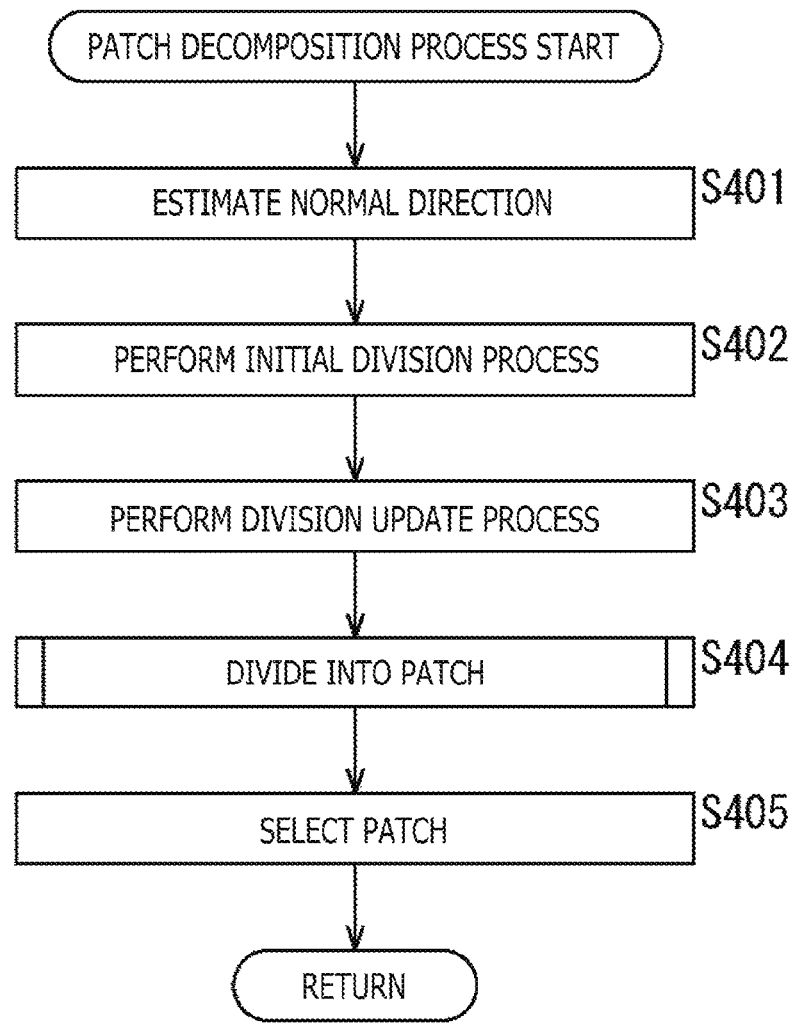
FIG. 21 is a flowchart explaining an example of a flow of a patch decomposition process.
Figure 22:
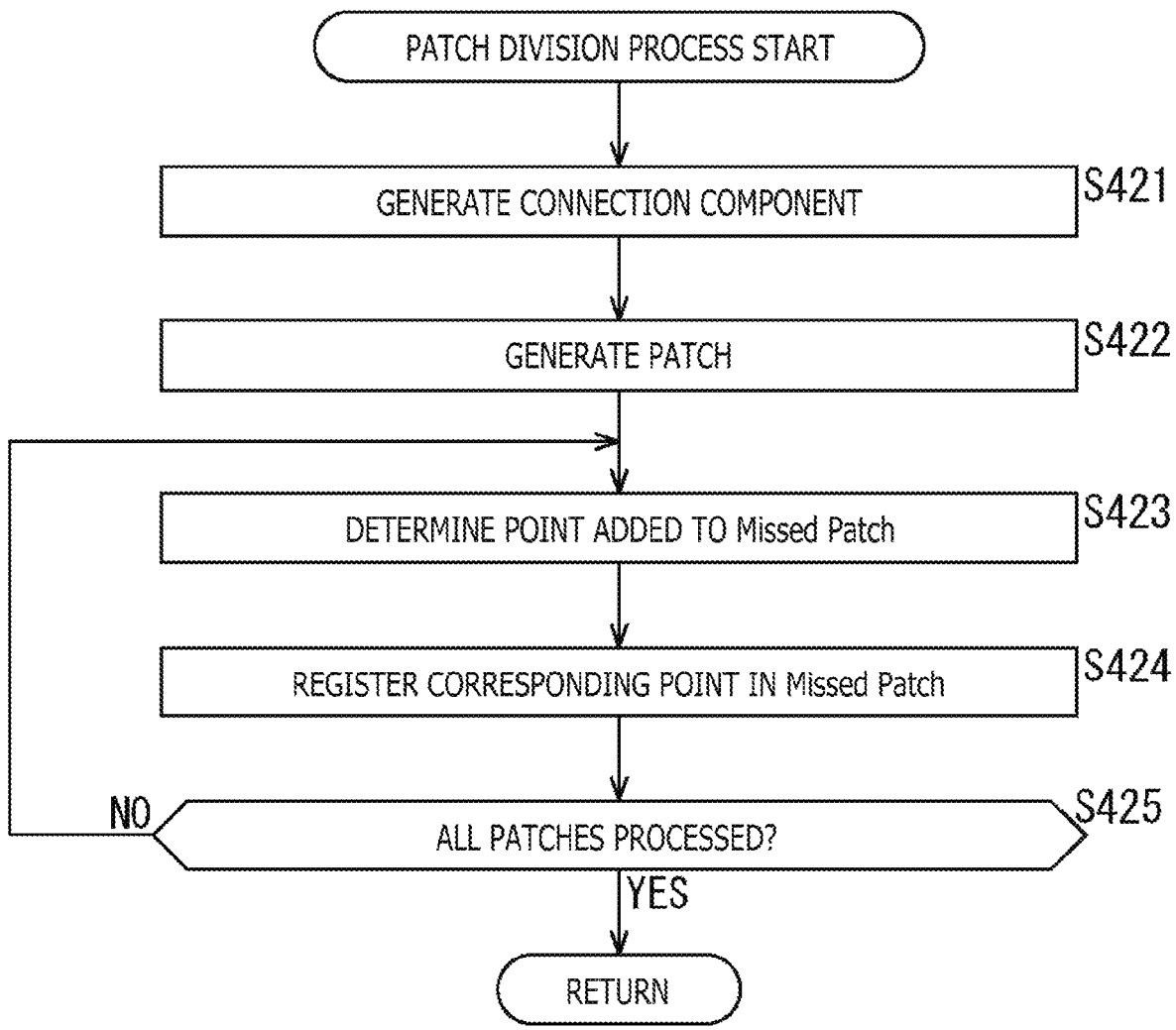
FIG. 22 is a flowchart explaining an example of a flow of a patch division process.

In step S422, the patch decomposition unit 111 projects each of the generated connection components on the two-dimensional plane in the projection direction set by processing in steps S402 and S403 in FIG. 21 to generate patches.

In step S423, the patch decomposition unit 111 selects a patch corresponding to a processing target from unprocessed patches included in generated patches, and determines a point added to Missed Patch for the patch as the processing target. A method for this determination may be any method. For example, the respective methods described in <Method 3> of the present embodiment may be applied.

In step S424, the patch decomposition unit 111 registers the corresponding point (i.e., point to be added to Missed Patch) in Missed Patch on the basis of a determination result in step S423.

In step S425, the patch decomposition unit 111 determines whether or not all of the patches have been processed. In a case of determination that an unprocessed patch is present, the flow returns to step S423. Specifically, the patch decomposition unit 111 executes respective processes from step S423 to step S425 for each of the patches. Thereafter, in a case of determination that all of the patches have been processed in step S425, the patch division process ends, and the process returns to FIG. 21.

A loss caused by projection can be reduced by executing the respective processes described above. Accordingly, reduction of subjective image quality deterioration of a display image is achievable.

<Application of Method 3 to Decoding Device>

The present technology (Method 3) described in <Method 3> of the present embodiment is applicable to the decoding device 200 in FIG. 12. For example, the video decoding unit 213 decodes coded data which includes a patch generated by projecting, on a two-dimensional plane, a connection component constituted by points that are included in a point group representing a three-dimensional structure, located adjacent to each other, and projected in an identical direction, and Missed Patch containing information associated with a point which may be lost by projection of the connection component. Moreover, the 3D reconstruction unit 217 reconstructs the point group using the patch and Missed Patch obtained by decoding coded data using the video decoding unit 213.

In this manner, a loss caused by projection can be reduced. Accordingly, reduction of subjective image quality deterioration of a display image is achievable.

<Flow of Decoding Process>

The decoding device 200 in this case (decoding device 200 to which Method 3 is applied) performs a flow similar to the flow of the case described with reference to the flowchart in FIG. 13 to execute a decoding process.

<Flow of Point Cloud Reconstruction Process>

Figure 23:
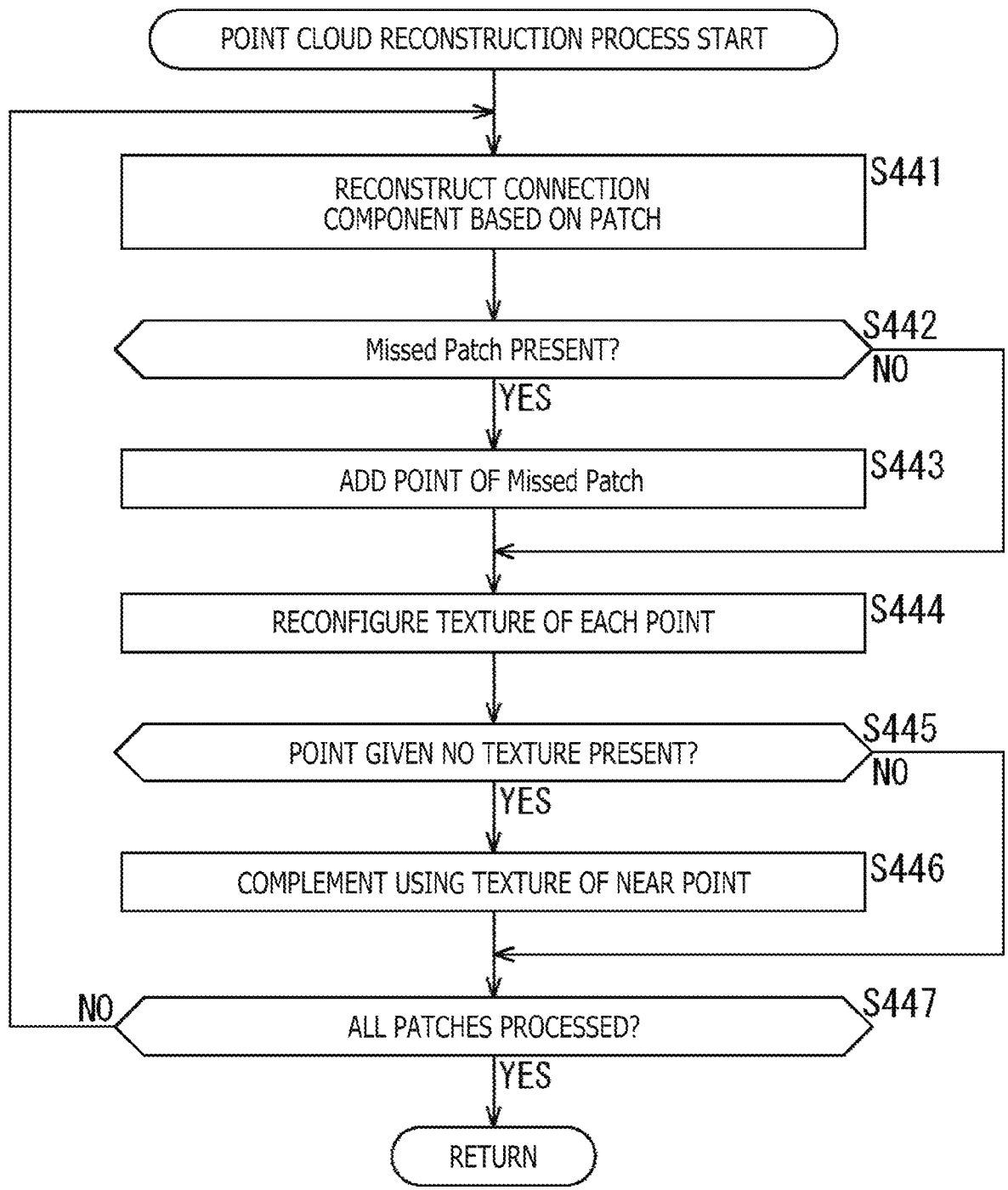
FIG. 23 is a flowchart explaining an example of a flow of a point cloud reconstruction process.

Subsequently described with reference to a flowchart in FIG. 23 will be an example of a flow of a point cloud reconstruction process in this case executed in step S207 in FIG. 13.

At a start of the point cloud reconstruction process, the 3D reconstruction unit 217 in step S441 reconstructs a connection component on the basis of a patch.

In step S442, the 3D reconstruction unit 217 determines whether or not Missed Patch is present. In a case of determination that Missed Patch is present, the flow proceeds to step S443.

In step S443, the 3D reconstruction unit 217 adds a point of Missed Patch to the connection component. After completion of processing in step S443, the process proceeds to step S444. Moreover, in a case of determination that Missed Patch is absent in step S442, processing in step S443 is skipped (omitted), and the process proceeds to step S444.

In step S444, the 3D reconstruction unit 217 reconfigures texture of each point of the reconstructed connection component on the basis of a patch of attribute information corresponding to a patch of position information corresponding to a processing target.

In step S445, the 3D reconstruction unit 217 determines whether or not a point given no attribute information is present. In a case of determination that a point given no attribute information, i.e., a point lost during projection but complemented by Missed Patch is present in processing in step S444, the process proceeds to step S446.

In step S446, the 3D reconstruction unit 217 searches a near point located near the point given no attribute information on the basis of a patch of position information, and creates (complements) attribute information associated with the point given no attribute information using attribute information associated with the near point. A method for complementing the attribute information may be any method. For example, the respective methods described in <Method 3> of the present embodiment may be applied. After completion of this processing, the process proceeds to step S447.

In step S447, the 3D reconstruction unit 217 determines whether or not all of the patches of position information have been processed. In a case of determination that an unprocessed patch is present, the flow returns to step S441. Specifically, respective processes from step S441 to step S447 are executed for each of the patches of position information as necessary. Thereafter, in a case of determination that all of the patches have been processed in step S447, the point cloud reconstruction process ends, and the process returns to FIG. 13.

A loss caused by projection can be reduced by executing the respective processes described above. Accordingly, reduction of subjective image quality deterioration of a display image is achievable.

5. Fourth Embodiment

<Method 4>

Method 4 will be explained in the present embodiment. In the case of Method 4, a projection direction of a partial region of a small region is adaptively defined on the basis of a point contained in the partial region. For example, a patch is initially generated by setting a small value to a parameter A of a projection direction, and a projection direction corresponding to a smaller area is selected from projection directions in each of which a change of the number of points is a threshold or smaller.

This configuration allows projection of each of partial regions within the small region in a more preferable direction (i.e., in such a direction where the number of points lost by projection decreases), and therefore reduces a loss caused by projection. Accordingly, reduction of subjective image quality deterioration of a display image is achievable.

Figure 24:
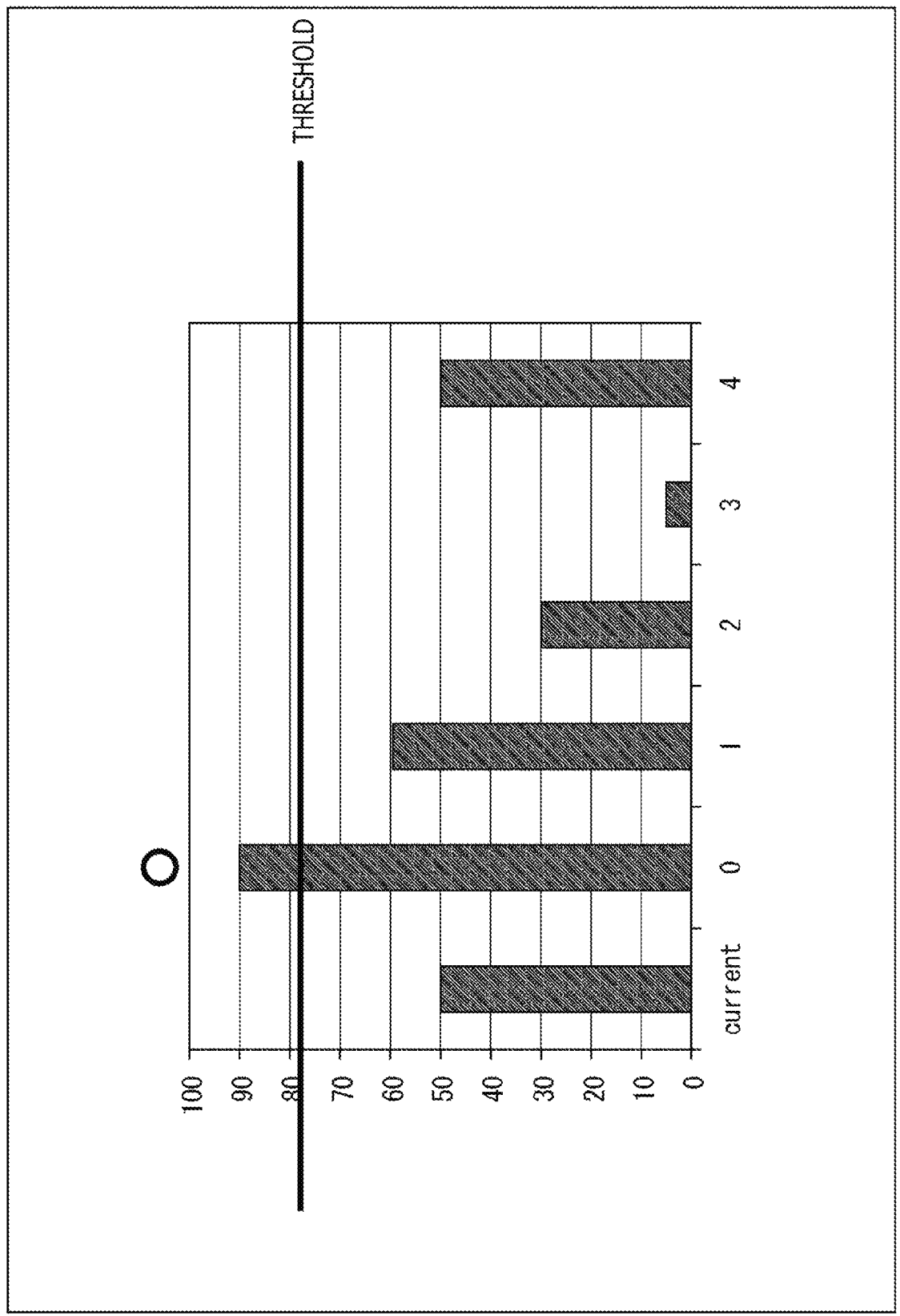
FIG. 24 is a diagram presenting an example of a state of determination based on a threshold.

Note that a method for evaluating the change of the number of points may be any method. For example, the change of the number of points may be evaluated on the basis of a percentage of the number of lost points in the number of points contained in the connection component. For example, the number of points lost by projection is derived as a difference between the number of points contained in the connection component and the number of points remaining in the patch after projection. Subsequently, a percentage of the number of lost points is derived as a percentage of the number of lost points in the number of points contained in the connection component (a value obtained by dividing the number of lost points by the number of points contained in the connection component). Thereafter, this percentage of the number of lost points is evaluated using a threshold for each of six directions (e.g., up, down, front, rear, left, and right) as depicted in FIG. 24, for example. In the case of the example depicted in FIG. 24, a direction 0 exceeds the threshold. A projection direction corresponding to a smaller area is thus selected from projection directions not exceeding the threshold. In this manner, the size of the patch may be sequentially reduced.

<Application of Method 4 to Coding Device>

The present technology (Method 4) described in <Method 4> of the present embodiment is applicable to the coding device 100 in FIG. 8. For example, the patch decomposition unit 111 generates a patch by projecting a part of a connection component constituted by points that are included in a point group representing a three-dimensional structure, located adjacent to each other, and projected in an identical direction. In this case, the part of the connection component is projected in a projection direction updated on the basis of the part of the connection component. The patch decomposition unit 111 further generates a patch by projecting the other part of the connection component in a projection direction set on the basis of the entire connection component. Moreover, the video coding unit 114 codes a frame image where the patches generated by the patch decomposition unit 111 are arranged.

This configuration allows projection of each of partial regions within the small region in a more preferable direction (i.e., in such a direction where the number of points lost by projection decreases), and therefore reduces a loss caused by projection. Accordingly, reduction of subjective image quality deterioration of a display image is achievable.

Needless to say, other aspects of the present technology associated with Method 4 described above in <Method 4> of the present embodiment may be applied to the coding device 100. In this case, advantageous effects similar to those described above in <Method 4> of the present embodiment are offerable.

<Flow of Coding Process>

The coding device 100 in this case (coding device 100 to which Method 4 is applied) performs a flow similar to the flow of the case described with reference to the flowchart in FIG. 9 to execute a coding process.

<Flow of Patch Decomposition Process>

Described with reference to a flowchart in FIG. 25 will be an example of a flow of a patch decomposition process executed in step S101 in FIG. 9 using the coding device 100 in this case (coding device 100 to which Method 4 is applied).

At a start of the patch decomposition process, the patch decomposition unit 111 in step S501 estimate normal directions of respective points of a point cloud. In step S502, the patch decomposition unit 111 performs an initial division process. For example, the patch decomposition unit 111 selects a projection direction from six candidate directions (e.g., up, down, front, rear, left, and right) for each of the points, and classifies each of the points on the basis of the selected projection direction. In step S503, the patch decomposition unit 111 performs a division update process.

In step S504, the patch decomposition unit 111 projects the respective points on the two-dimensional plane in accordance with the above classification to generate patches. After completion of processing in step S504, the patch division process ends, and the process returns to FIG. 9.

<Flow of Division Update Process>

Subsequently described with reference to a flowchart in FIG. 26 will be an example of a flow of the division update process executed in step S503 in FIG. 25.

At a start of the division update process, the patch decomposition unit 111 performs a smoothing process in step S521. In step S522, the patch decomposition unit 111 performs a projection direction update process to set a projection direction for each partial region smaller than a small region.

Figure 25:
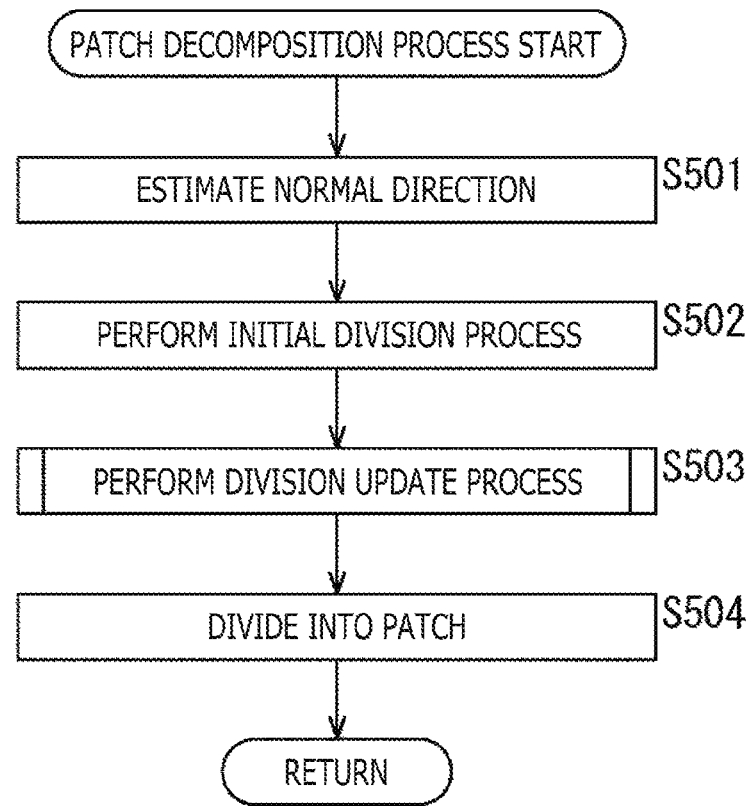
FIG. 25 is a flowchart explaining an example of a flow of a patch decomposition process.
Figure 26:
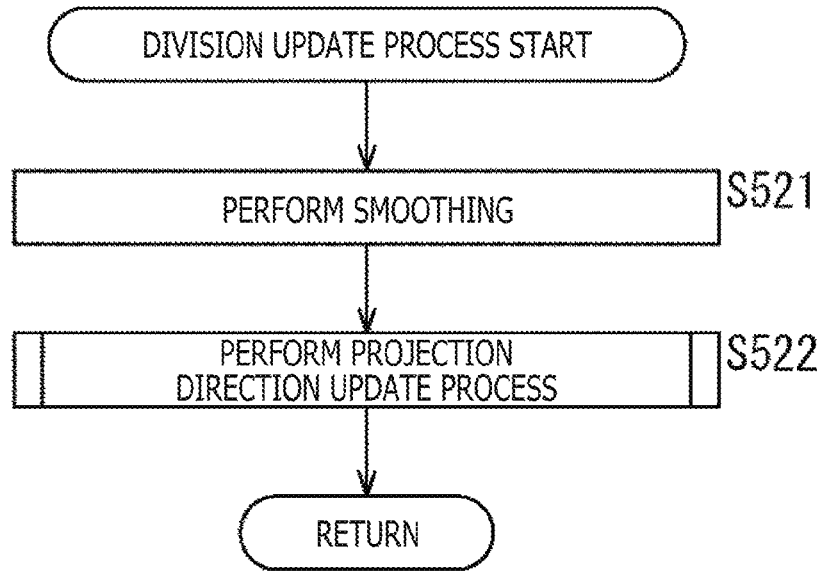
FIG. 26 is a flowchart explaining an example of a flow of a division update process.

After completion of processing in step S522, the process returns to FIG. 25.

<Flow of Projection Direction Update Process>

Figure 27:
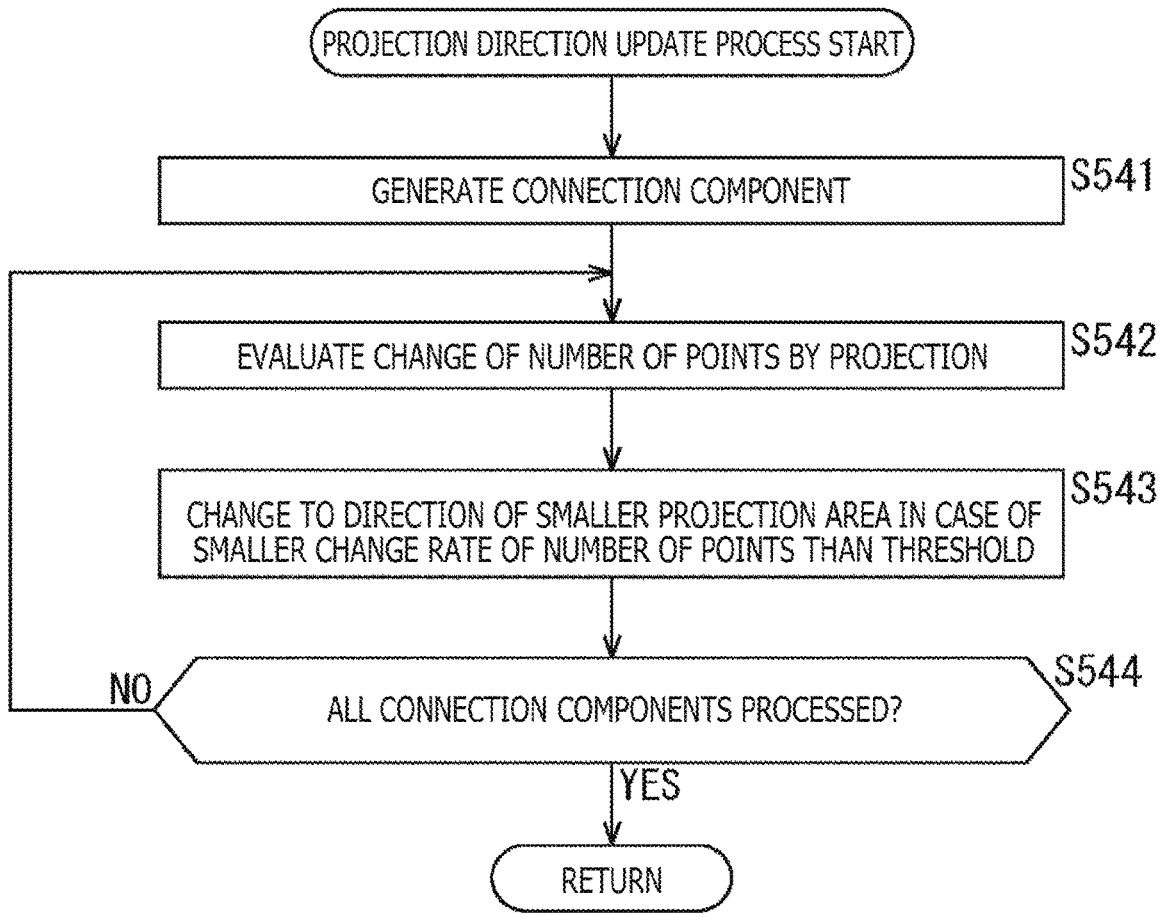
FIG. 27 is a flowchart explaining an example of a flow of a projection direction update process.

Subsequently described with reference to a flowchart in FIG. 27 will be an example of a flow of the projection direction update process executed in step S522 in FIG. 26.

At a start of the projection direction update process, the patch decomposition unit 111 generates a connection component in step S541.

In step S542, the patch decomposition unit 111 evaluates a change of the number of points caused by projection. A method for this evaluation may be any method. For example, the respective methods described in <Method 4> of the present embodiment may be applied.

In step S543, the patch decomposition unit 111 selects a direction corresponding to a smaller projection area from directions in each of which a change rate of the number of points is smaller than a threshold on the basis of an evaluation result thus obtained, and changes the projection direction to the selected direction. Moreover, the patch decomposition unit 111 resets a patch according to the selected direction.

In step S544, the patch decomposition unit 111 determines whether or not all of the patches have been processed. In a case of determination that an unprocessed patch is present, the flow returns to step S542. Specifically, the patch decomposition unit 111 executes respective processing from step S542 to step S544 for each of the patches. Thereafter, in a case of determination that all of the patches have been processed in step S544, the patch division process ends, and the process returns to FIG. 26.

The respective processes executed in the manner described above achieve projection of each of partial regions within the small region in a more preferable direction (i.e., in such a direction where the number of points lost by projection decreases), and therefore reduce a loss caused by projection. Accordingly, reduction of subjective image quality deterioration of a display image is achievable.

<Decoding>

In a case where coding is performed by using the present technology (Method 4) in <Method 4> of the present embodiment, decoding of a bit stream thus obtained is allowed to be performed in a manner similar to a manner of conventional decoding. In this case, the decoding device 200 may have a configuration similar to the configuration described with reference to FIG. 12. Moreover, it is sufficient if the decoding process is executed by a flow similar to the flow described with reference to the flowchart in FIG. 13.

<Flow of Point Cloud Reconstruction Process>

Figure 28:
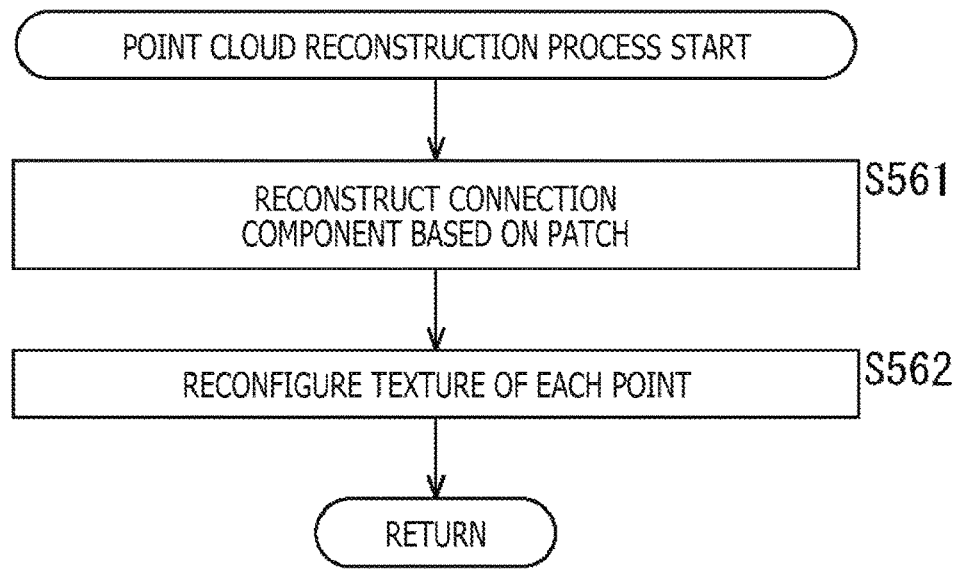
FIG. 28 is a flowchart explaining an example of a flow of a point cloud reconstruction process.

Subsequently described with reference to a flowchart in FIG. 28 will be an example of a flow of a point cloud reconstruction process in this case executed in step S207 in FIG. 13.

At a start of the point cloud reconstruction process, the 3D reconstruction unit 217 in step S561 reconstructs a connection component on the basis of a patch.

In step S562, the 3D reconstruction unit 217 reconfigures texture of each point of the reconstructed connection component on the basis of a patch of attribute information corresponding to a patch of position information corresponding to a processing target.

After completion of processing in step S562, the point cloud reconstruction process ends, and the process returns to FIG. 13.

As apparent from above, a bit stream coded by applying the present technology (Method 4) is easily decodable.

6. Supplementary Notes

<Control Information>

Control information associated with the present technology described in the respective above embodiments may be transferred from the coding side to the decoding side. For example, control information (e.g., enabled_flag) for controlling whether or not application of the present technology described above is allowed (or prohibited) may be transferred. Moreover, for example, control information for specifying a range where application of the present technology described above is allowed (or prohibited) (e.g., an upper limit or a lower limit of a block size or both of these limits, a slice, a picture, a sequence, a component, a view, a layer, or the like) may be transferred.

<Computer>

A series of processes described above may be executed either by hardware or by software. In a case where the series of processes are executed by software, a program constituting the software is installed in a computer. Examples of the computer herein include a computer incorporated in dedicated hardware, and a computer capable of executing various functions under various programs installed in the computer, such as a general-purpose personal computer.

Figure 29:
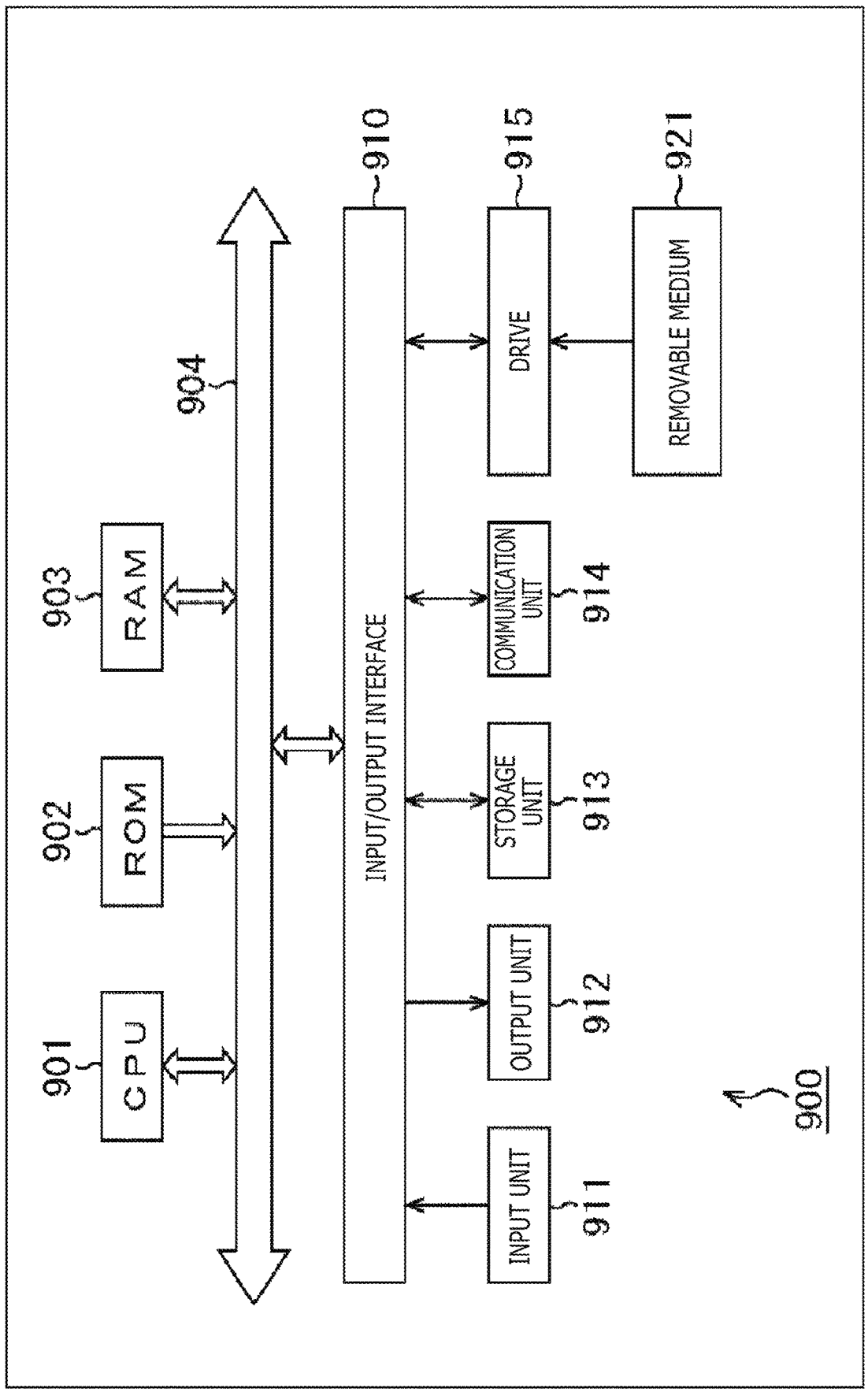
FIG. 29 is a block diagram depicting a main configuration example of a computer.

FIG. 29 is a block diagram depicting a hardware configuration example of a computer which executes the series of processes described above under a program.

A computer 900 depicted in FIG. 29 includes a CPU (Central Processing Unit) 901, a ROM (Read Only Memory) 902, and a RAM (Random Access Memory) 903 connected to each other via a bus 904.

An input/output interface 910 is further connected to the bus 904. An input unit 911, an output unit 912, a storage unit 913, a communication unit 914, and a drive 915 are connected to the input/output interface 910.

For example, the input unit 911 is constituted by a keyboard, a mouse, a microphone, a touch panel, an input terminal, and others. For example, the output unit 912 is constituted by a display, a speaker, an output terminal, and others. For example, the storage unit 913 is constituted by a hard disk, a RAM disk, a non-volatile memory, and others. For example, the communication unit 914 is constituted by a network interface and others. The drive 915 drives a removable medium 921 such as a magnetic disk, an optical disk, a magneto-optical disk, and a semiconductor memory.

According to the computer configured as described above, for example, the CPU 901 loads a program stored in the storage unit 913 into the RAM 903 via the input/output interface 910 and the bus 904, and executes the loaded program to perform the series of processes described above. Data and the like required when the CPU 901 executes various processes are also stored in the RAM 903 as necessary.

For example, the program executed by the computer is allowed to be recorded in the removable medium 921 as a package medium or the like, and provided in this form. In this case, the program is allowed to be installed into the storage unit 913 via the input/output interface 910 from the removable medium 921 attached to the drive 915.

Moreover, the program is allowed to be provided via a wired or wireless transfer medium such as a local area network, the Internet, and digital satellite broadcasting. In this case, the program is allowed to be received by the communication unit 914, and installed into the storage unit 913.

Furthermore, the program is allowed to be installed in the ROM 902 or the storage unit 913 beforehand.

<Application Target of Present Technology>

While the case where the present technology is applied to coding and decoding of point cloud data has been described, the present technology is not limited to this example but may be applied to coding and decoding of 3D data in conformity with any standards. Specifically, various types of processes such as coding and decoding systems, and specifications of various types of data such as 3D data and metadata may be any processes and specifications as long as no inconsistency with the present technology described above is produced. Moreover, a part of processes and specifications described above may be omitted as long as no inconsistency with the present technology is produced.

Furthermore, while the coding device 100 and the decoding device 200 have been described above as an application example of the present technology, the present technology is applicable to any configurations.

For example, the present technology is applicable to various types of electronic apparatuses, such as a transmitter and a receiver (e.g., a television receiver and a cellular phone) used in broadcasting, wired broadcasting such as cable TV, distribution in the Internet, and distribution to a terminal via cellular communication, and a device (e.g., a hard disk recorder and a camera) which records an image in a medium such as an optical disk, a magnetic disk, and a flash memory, and reproduces an image from these recording medium.

Moreover, for example, the present technology is allowed to be practiced as a configuration of a part of a device, such as a processor (e.g., video processor) as a system LSI (Large Scale Integration) or the like, a module (e.g., video module) using a plurality of processors or the like, a unit (e.g., video unit) using a plurality of modules or the like, and a set (e.g., video set) as a unit to which another function is added.

Furthermore, for example, the present technology is applicable to a network system constituted by a plurality of devices. For example, the present technology may be practiced as cloud computing where processes are shared by a plurality of devices and performed by the devices in cooperation with each other via a network. For example, the present technology may be practiced in a cloud service which provides services associated with images (moving images) for any terminal such as a computer, an AV (Audio Visual) apparatus, portable information processing terminal, and an IoT (Internet of Things) device.

Note that a system in the present description refers to a set of a plurality of constituent elements (devices, modules (parts), or the like). A set of constituent elements are regarded as a system regardless of whether or not all of the constituent elements are contained in an identical housing. Accordingly, a plurality of devices accommodated in different housings and connected to each other via a network, and one device which contains a plurality of modules in one housing are both regarded as a system.

<Fields and Use Applications to which Present Technology is Applicable>

A system, a device, a processing unit, and the like to which the present technology is applied is usable in any fields, such as traffics, medical treatments, crime prevention, agriculture, stock breeding, mining, beauty, plants, home appliances, meteorology, and nature surveillance. Moreover, use applications in these fields may be any use applications.

<Others>

Note that a "flag" in the present description refers to information for identifying a plurality of states, and include not only information used for identifying two states constituted by true (1) and false (0) states, but also information allowing identification of three or more states. Accordingly, the "flag" may have two values constituted by 1 and 0, for example, or three or more values. In other words, the number of bits constituting the "flag" may be any number. The "flag" therefore may be constituted by one bit or a plurality of bits. Moreover, it is assumed that a bit stream includes not only identification information (including flag), but also difference information indicating a difference between the identification information and information as a certain reference. Accordingly, the "flag" and the "identification information" in the present description contains not only the corresponding information, but also difference information indicating a difference from information as a reference.

Furthermore, various information (e.g., metadata) concerning coded data (bit stream) may be transferred or recorded in any forms as long as the information is associated with the coded data. The term "associated" herein refers to a state where other data is made available (linked) during processing of one data, for example. Accordingly, respective pieces of data associated with each other may be combined into one piece of data, or may be handled as separate pieces of data. For example, information associated with coded data (image) may be transferred via a transfer path different from a transfer path of this coded data (image). Moreover, for example, information associated with coded data (image) may be recorded in a recording medium different from a recording medium (or a different recording area of the same recording medium) of this coded data (image). Note that the "associated" state is not limited to a state of the entire data, but may be a state of a part of the data. For example, an image and information associated with the image may be associated with each other in units of any frame, such as a plurality of frames, one frame, or a part in a frame.

Note that each of terms such as "synthesize," "multiplex," "add," "integrate," "include," "store," "put into," "stick into," and "insert" in the present description refers to combining a plurality of pieces into one piece, such as combining coded data and metadata into one piece of data, and indicates one method of producing the "associated" state described above.

Furthermore, embodiments of the present technology are not limited to the embodiments described above, but may be modified in various manners without departing from the subject matters of the present technology.

For example, a configuration described as one apparatus (or processing unit) may be divided into a plurality of apparatuses (or processing units). Conversely, a configuration described above as a plurality of apparatuses (or processing units) may be combined into one apparatus (or processing unit). Furthermore, needless to say, a configuration other than the configurations described above may be added to respective apparatuses (or respective processing units). In addition, if configurations or operations as the entire system are substantially identical, a part of a configuration of a certain apparatus (or processing unit) may be included in a configuration of another apparatus (or another processing unit).

Furthermore, for example, programs described above may be executed by any apparatus. In this case, it is sufficient if the apparatus has a necessary function (e.g., a function block), and acquires necessary information.

In addition, for example, respective steps described in one flowchart may be executed by one apparatus, or shared and executed by a plurality of apparatuses. Moreover, in a case where one step includes a plurality of processes, the plurality of processes included in the one step may be executed by one apparatus, or shared and executed by a plurality of apparatuses. In other words, a plurality of processes included in one step may be executed as processes of a plurality of steps. Conversely, processes described as a plurality of steps may be combined and executed as one step.

Moreover, for example, a program executed by a computer may be a program where processes of steps describing the program are executed in an order described in the present description in time series, or separately executed in parallel or at necessary timing such as an occasion of a call. In other words, the processes of the respective steps may be executed in an order different from the order described above as long as no inconsistency is produced. Furthermore, the processes of the steps describing the program may be executed in parallel with processes of other programs, or may be executed in combination with other programs.

In addition, for example, a plurality of technologies associated with the present technology may be independently practiced as separate items as long as no inconsistency is produced. Needless to say, any of the plurality of aspects of the present technology may be combined and practiced. For example, a part or all of the present technology described in any one of the embodiments may be combined with a part or all of the present technology described in any of the other embodiments. In addition, a part or all of any aspect of the present technology may be combined with other technologies not described above, and practiced in this form.

Note that the present technology may have the following configurations.

(1)
An image processing apparatus including:
a patch generation unit that projects, on a two-dimensional plane in a plurality of directions, a connection component constituted by points that are included in a point group representing a three-dimensional structure, located adjacent to each other, and projected in an identical direction to generate patches in the respective directions; and
a coding unit that codes a frame image where the patches generated in the respective directions by the patch generation unit are arranged.

(2)
The image processing apparatus according to (1), in which the patch generation unit generates a main patch by projecting the entire connection component in a predetermined direction, and generates a sub patch by projecting the entire connection component in a direction different from the predetermined direction.

(3)
The image processing apparatus according to (2), in which the patch generation unit generates the main patch for each of position information and attribute information both associated with the connection component, and generates the sub patch for the position information associated with the connection component.

(4)
The image processing apparatus according to (2), in which
the patch generation unit separates the generated sub patch into a plurality of parts for each row or column; and
the coding unit codes a frame image where the sub patch separated into the plurality of parts for each row or column is arranged.

(5)
The image processing apparatus according to (1), in which the patch generation unit generates a patch by projecting the entire connection component in a predetermined direction, and generates a partial patch by projecting a part of the connection component in a direction different from the predetermined direction.

(6)
The image processing apparatus according to (5), in which the patch generation unit generates the patch for each of position information and attribute information both associated with the connection component, and generates the partial patch for the position information associated with the connection component.

(7)
The image processing apparatus according to (5), further including:
an occupancy map generation unit that generates an occupancy map associated with the patch generated by the patch generation unit; and
an auxiliary patch information generation unit that generates auxiliary patch information that includes information associated with a region that contains the partial patch generated by the patch generation unit.

(8)
The image processing apparatus according to (5), in which
the patch generation unit separates a region that contains the generated partial patch into a plurality of parts for each row or column; and
the coding unit codes a frame image where the region containing the partial patch and separated into the plurality of parts for each row or column is arranged.

(9)
An image processing method including:
projecting, on a two-dimensional plane in a plurality of directions, a connection component constituted by points that are included in a point group representing a three-dimensional structure, located adjacent to each other, and projected in an identical direction to generate patches in respective directions; and
coding a frame image where the patches generated in the respective directions are arranged.

(10)
An image processing apparatus including:
a decoding unit that decodes coded data of a frame image where patches are arranged in a plurality of directions, the patches being generated by projecting, on two-dimensional planes in the respective directions, a connection component constituted by points that are included in a point group representing a three-dimensional structure, located adjacent to each other, and projected in an identical direction; and
a reconstruction unit that reconstructs the point group using the patches in the respective directions obtained by decoding the coded data using the decoding unit.

(11)
The image processing apparatus according to (10), in which
the decoding unit decodes the coded data of the frame image where a main patch generated by projecting the entire connection component in a predetermined direction, and a sub patch generated by projecting the entire connection component in a direction different from the predetermined direction are arranged; and
the reconstruction unit reconstructs the point group using the main patch and the sub patch obtained by decoding the coded data using the decoding unit.

(12)
The image processing apparatus according to (10), in which
the decoding unit decodes the coded data of the frame image where a patch generated by projecting the entire connection component in a predetermined direction, and a partial patch generated by projecting a part of the connection component in a direction different from the predetermined direction are arranged; and
the reconstruction unit reconstructs the point group using the patch and the partial patch obtained by decoding the coded data using the decoding unit.

(13)
An image processing method including:
decoding coded data of a frame image where patches are arranged in a plurality of directions, the patches being generated by projecting, on a two-dimensional plane in the respective directions, a connection component constituted by points that are included in a point group representing a three-dimensional structure, located adjacent to each other, and projected in an identical direction; and
reconstructing the point group using the patches in the respective directions obtained by decoding the coded data.

(14)
An image processing apparatus including:
a patch generation unit that
generates a patch by projecting, on a two-dimensional plane, a connection component constituted by points that are included in a point group representing a three-dimensional structure, located adjacent to each other, and projected in an identical direction, and
generates Missed Patch that contains information associated with a point likely to be lost by projection of the connection component; and
a coding unit that codes a frame image where the patch generated by the patch generation unit is arranged, and the Missed Patch.

(15)
The image processing apparatus according to (14), in which the patch generation unit generates Missed Patch that contains position information associated with a point likely to be lost by projection of the connection component.

(16)
An image processing method including:
generating a patch by projecting, on a two-dimensional plane, a connection component constituted by points that are included in a point group representing a three-dimensional structure, located adjacent to each other, and projected in an identical direction;
generating Missed Patch that contains information associated with a point likely to be lost by projection of the connection component; and
coding a frame image where the generated patch is arranged, and the Missed Patch.

(17)
An image processing apparatus including:
a decoding unit that decodes coded data that includes a patch obtained by projecting, on a two-dimensional plane, a connection component constituted by points that are included in a point group representing a three-dimensional structure, located adjacent to each other, and projected in an identical direction, and Missed Patch containing information associated with a point likely to be lost by projection of the connection component; and
a reconstruction unit that reconstructs the point group using the patch and the Missed Patch obtained by decoding the coded data using the decoding unit.

(18)
An image processing method including:
decoding coded data that includes a patch obtained by projecting, on a two-dimensional plane, a connection component constituted by points that are included in a point group representing a three-dimensional structure, located adjacent to each other, and projected in an identical direction, and Missed Patch containing information associated with a point likely to be lost by projection of the connection component; and
reconstructing the point group using the patch and the Missed Patch obtained by decoding the coded data.

(19)
An image processing apparatus including:
a patch generation unit that generates a patch by projecting a part of a connection component constituted by points that are included in a point group representing a three-dimensional structure, located adjacent to each other, and projected in an identical direction, such that the part of the connection component is projected in a projection direction updated on the basis of the part of the connection component, and generates a patch by projecting the other part of the connection component in a projection direction set on the basis of the entire connection component; and
a coding unit that codes a frame image where the patches generated by the patch generation unit are arranged.

(20)
An image processing method including:
generating a patch by projecting a part of a connection component constituted by points that are included in a point group representing a three-dimensional structure, located adjacent to each other, and projected in an identical direction, such that the part of the connection component is projected in a projection direction updated on the basis of the part of the connection component, and generating a patch by projecting the other part of the connection component in a projection direction set on the basis of the entire connection component; and
coding a frame image where the generated patches are arranged.

REFERENCE SIGNS LIST

31: Main patch
32: Sub patch

100: Coding device
111: Patch decomposition unit
112: Packing unit
113: Auxiliary patch information compression unit
114: Video coding unit
115: Video coding unit
116: OMap coding unit
117: Multiplexer
200: Decoding device
211: Demultiplexer
212: Auxiliary patch information decoding unit
213: Video decoding unit
214: Video decoding unit
215: OMap decoding unit
216: Unpacking unit
217: 3D reconstruction unit

The invention claimed is:

1. An image processing apparatus, comprising:
a patch generation unit configured to project, on a two-dimensional plane in a plurality of directions, a connection component constituted by points that are included in a point group that represents a three-dimensional structure, located adjacent to each other, wherein the connection component is projected in an identical direction to generate patches in the respective directions; and
a coding unit configured to code a frame image where the patches generated in the respective directions by the patch generation unit are arranged.

2. The image processing apparatus according to claim 1, wherein the patch generation unit is further configured to:
generate a main patch by projecting the entire connection component in a specific direction, and
generate a sub patch by projecting the entire connection component in a direction different from the specific direction.

3. The image processing apparatus according to claim 2, wherein the patch generation unit is further configured to:
generate the main patch for each of position information and attribute information both associated with the connection component, and
generate the sub patch for the position information associated with the connection component.

4. The image processing apparatus according to claim 2, wherein
the patch generation unit is further configured to separate the generated sub patch into a plurality of parts for each row or column; and
the coding unit is further configured to code a frame image where the sub patch separated into the plurality of parts for each row or column is arranged.

5. The image processing apparatus according to claim 1, wherein the patch generation unit generates is further configured to:
a patch by projecting the entire connection component in a specific direction, and
generate a partial patch by projecting a part of the connection component in a direction different from the specific direction.

6. The image processing apparatus according to claim 5, wherein the patch generation unit is further configured to:
generate the patch for each of position information and attribute information both associated with the connection component, and
generate the partial patch for the position information associated with the connection component.

7. The image processing apparatus according to claim 5, further comprising:
an occupancy map generation unit configured to generate an occupancy map associated with the patch generated by the patch generation unit; and
an auxiliary patch information generation unit configured to generate auxiliary patch information that includes information associated with a region that contains the partial patch generated by the patch generation unit.

8. The image processing apparatus according to claim 5, wherein
the patch generation unit is further configured to separate a region that contains the generated partial patch into a plurality of parts for each row or column; and
the coding unit is further configured to code a frame image where the region containing the partial patch and separated into the plurality of parts for each row or column is arranged.

9. An image processing method, comprising:
projecting, on a two-dimensional plane in a plurality of directions, a connection component constituted by points that are included in a point group that represents a three-dimensional structure, located adjacent to each other, wherein the connection component is projected in an identical direction to generate patches in respective directions; and
coding a frame image where the patches generated in the respective directions are arranged.

10. An image processing apparatus, comprising:
a decoding unit configured to decode coded data of a frame image where patches are arranged in a plurality of directions, the patches being generated by projecting, on a two-dimensional plane in the respective directions, a connection component constituted by points that are included in a point group that represents a three-dimensional structure, located adjacent to each other, wherein the connection component is projected in an identical direction; and
a reconstruction unit configured to reconstruct the point group using the patches in the respective directions obtained by decoding the coded data using the decoding unit.

11. The image processing apparatus according to claim 10, wherein
the decoding unit is further configured to decode the coded data of the frame image where a main patch generated by projecting the entire connection component in a specific direction, and a sub patch generated by projecting the entire connection component in a direction different from the specific direction are arranged; and
the reconstruction unit is further configured to reconstruct the point group using the main patch and the sub patch obtained by decoding the coded data using the decoding unit.

12. The image processing apparatus according to claim 10, wherein
the decoding unit is further configured to decode the coded data of the frame image where a patch generated by projecting the entire connection component in a specific direction, and a partial patch generated by projecting a part of the connection component in a direction different from the specific direction are arranged; and the reconstruction unit is further configured to reconstruct the point group using the patch and the partial patch obtained by decoding the coded data using the decoding unit.

13. An image processing method, comprising:
decoding coded data of a frame image where patches are arranged in a plurality of directions, the patches being generated by projecting, on a two-dimensional plane in the respective directions, a connection component constituted by points that are included in a point group that represents a three-dimensional structure, located adjacent to each other, wherein the connection component is projected in an identical direction; and
reconstructing the point group using the patches in the respective directions obtained by decoding the coded data.

14. An image processing apparatus, comprising:
a patch generation unit configured to:
  generate a patch by projecting, on a two-dimensional plane, a connection component constituted by points that are included in a point group that represents a three-dimensional structure, located adjacent to each other, wherein the connection component is projected in an identical direction, and
  generate Missed Patch that contains information associated with a point likely to be lost by projection of the connection component; and
a coding unit configured to code a frame image where the patch generated by the patch generation unit is arranged, and the Missed Patch.

15. The image processing apparatus according to claim 14, wherein the patch generation unit is further configured to generate Missed Patch that contains position information associated with a point likely to be lost by projection of the connection component.

16. An image processing method, comprising:
generating a patch by projecting, on a two-dimensional plane, a connection component constituted by points that are included in a point group representing a three-dimensional structure, located adjacent to each other, wherein the connection component is projected in an identical direction;
generating Missed Patch that contains information associated with a point likely to be lost by projection of the connection component; and
coding a frame image where the generated patch is arranged, and the Missed Patch.

17. An image processing apparatus, comprising:
a decoding unit configured to decode coded data that includes a patch obtained by projecting, on a two-dimensional plane, a connection component constituted by points that are included in a point group representing a three-dimensional structure, located adjacent to each other, wherein the connection component is projected in an identical direction, and Missed Patch containing information associated with a point likely to be lost by projection of the connection component; and
a reconstruction unit configured to reconstruct the point group using the patch and the Missed Patch obtained by decoding the coded data using the decoding unit.

18. An image processing method, comprising:
decoding coded data that includes a patch obtained by projecting, on a two-dimensional plane, a connection component constituted by points that are included in a point group that represents a three-dimensional structure, located adjacent to each other, wherein the connection component is projected in an identical direction, and Missed Patch containing information associated with a point likely to be lost by projection of the connection component; and
reconstructing the point group using the patch and the Missed Patch obtained by decoding the coded data.

19. An image processing apparatus, comprising:
a patch generation unit configured to:
  generate a patch by projecting a part of a connection component constituted by points that are included in a point group that represents a three-dimensional structure, located adjacent to each other, wherein
    the connection component is projected in an identical direction, such that the part of the connection component is projected in a projection direction updated based on the part of the connection component, and
  generate a patch by projecting another part of the connection component in a projection direction set based on the entire connection component; and
a coding unit configured to code a frame image where the patches generated by the patch generation unit are arranged.

20. An image processing method, comprising:
generating a patch by projecting a part of a connection component constituted by points that are included in a point group that represents a three-dimensional structure, located adjacent to each other, wherein
  the connection component is projected in an identical direction, such that the part of the connection component is projected in a projection direction updated based on the part of the connection component,
generating a patch by projecting another part of the connection component in a projection direction set based on the entire connection component; and
coding a frame image where the generated patches are arranged.

* * * * *